United States Patent
Sakaguchi et al.

(10) Patent No.: US 8,952,611 B2
(45) Date of Patent: Feb. 10, 2015

(54) ELECTRODE USED FOR DISCHARGE LAMP, HIGH PRESSURE DISCHARGE LAMP, LAMP UNIT, AND PROJECTION IMAGE DISPLAY APPARATUS

(75) Inventors: Jun Sakaguchi, Osaka (JP); Yoshiki Kitahara, Osaka (JP); Katsuhiro Ono, Osaka (JP); Kazunori Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 431 days.

(21) Appl. No.: 13/260,898

(22) PCT Filed: Mar. 4, 2011

(86) PCT No.: PCT/JP2011/001302
§ 371 (c)(1),
(2), (4) Date: Sep. 28, 2011

(87) PCT Pub. No.: WO2011/108288
PCT Pub. Date: Sep. 9, 2011

(65) Prior Publication Data
US 2012/0033190 A1 Feb. 9, 2012

(30) Foreign Application Priority Data

Mar. 5, 2010 (JP) .................. 2010-048709
Jul. 23, 2010 (JP) .................. 2010-165655

(51) Int. Cl.
*H01J 17/20* (2012.01)
*H01J 61/073* (2006.01)
*G03B 21/14* (2006.01)
(Continued)

(52) U.S. Cl.
CPC ............ *H01J 61/0735* (2013.01); *G03B 21/14* (2013.01); *G03B 21/20* (2013.01); *H01J 9/02* (2013.01); *H01J 61/0732* (2013.01); *G03B 21/2026* (2013.01); *G03B 21/2086* (2013.01)
USPC ............ 313/574; 313/567; 313/311; 313/113

(58) Field of Classification Search
USPC ............ 313/567, 623, 631–633, 346 R, 574, 313/311, 113
See application file for complete search history.

(56) References Cited

U.S. PATENT DOCUMENTS

2002/0190654 A1 12/2002 Kanzaki et al.
2006/0082312 A1 4/2006 Fukuyo et al.
(Continued)

FOREIGN PATENT DOCUMENTS

CN  101303958  11/2008
CN  101552176  10/2009
(Continued)

OTHER PUBLICATIONS

Chinese Application No. 201180001691.1 Office Action dated Sep. 18, 2013, 8 pages with partial English translation.

*Primary Examiner* — Nimeshkumar Patel
*Assistant Examiner* — Brenitra M Lee

(57) ABSTRACT

The present invention aims to prevent breakage of a sealing part and an electrode of a high pressure discharge lamp, and provides an electrode 100 used for a discharge lamp and having a rod-shaped part 101, one end of the rod-shaped part 101 to be sealed by a sealing part of an arc tube of the discharge lamp, the other end of the rod-shaped part 101 to be in a discharge space in the arc tube, wherein the rod-shaped part 101 has a rough surface that is composed of a plurality of types of crystal grains each having a different surface condition due to differences in crystal orientation.

11 Claims, 21 Drawing Sheets

(51) Int. Cl.
*G03B 21/20* (2006.01)
*H01J 9/02* (2006.01)

(56) References Cited

U.S. PATENT DOCUMENTS

| | | |
|---|---|---|
| 2007/0103082 A1 | 5/2007 | Fukuyo et al. |
| 2007/0182331 A1 | 8/2007 | Haselhorst et al. |
| 2007/0182332 A1* | 8/2007 | Haacke et al. ............... 313/633 |
| 2008/0315771 A1 | 12/2008 | Tsukamoto et al. |
| 2009/0140654 A1 | 6/2009 | Yamashita et al. |
| 2010/0225232 A1* | 9/2010 | Sumitomo et al. ............ 315/32 |
| 2010/0244689 A1* | 9/2010 | Kagebayashi et al. ........ 313/632 |

FOREIGN PATENT DOCUMENTS

| | | |
|---|---|---|
| JP | 03-283254 | 12/1991 |
| JP | 2002-373622 | 12/2002 |
| JP | 2005-015917 | 1/2005 |
| JP | 2006-040840 | 2/2006 |
| JP | 2006-140135 | 6/2006 |
| JP | 2007-134051 | 5/2007 |
| JP | 2008-282554 | 11/2008 |
| JP | 2009-135005 | 6/2009 |

* cited by examiner

▨ Crystal grain having [001] crystal orientation
▨ Crystal grain having [114] crystal orientation
▤ Crystal grain having [103] crystal orientation
▥ Crystal grain having [225] crystal orientation
▦ Crystal grain having [102] crystal orientation
☐ Crystal grains having any other crystal orientations ■ Crystal grain having been eroded by etching Crystal grain having [001] crystal orientation FIG. 13A
FIG. 13B
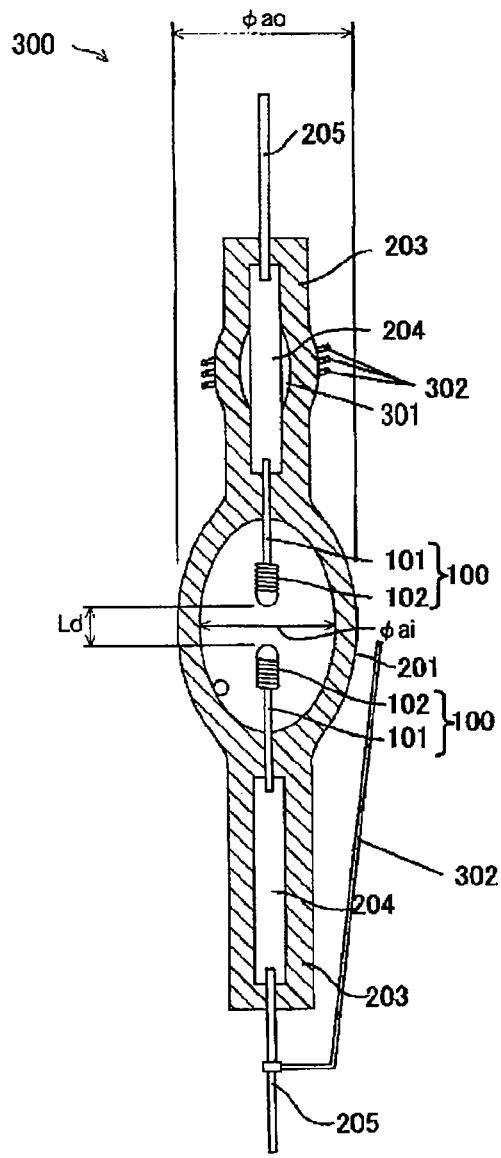
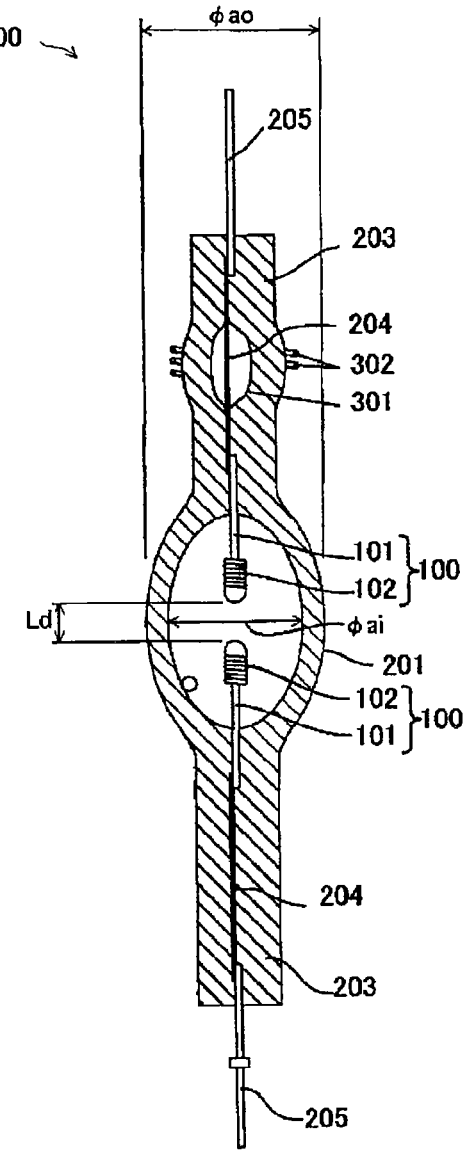

ELECTRODE USED FOR DISCHARGE LAMP, HIGH PRESSURE DISCHARGE LAMP, LAMP UNIT, AND PROJECTION IMAGE DISPLAY APPARATUS

TECHNICAL FIELD

The present invention relates to an electrode used for a discharge lamp, a high pressure discharge lamp, a lamp unit, and a projection image display apparatus.

BACKGROUND ART

FIG. 20 is an enlarged sectional view of a chief part of a conventional high pressure discharge lamp. A short arc extra-high pressure discharge lamp, as an example of the conventional high pressure discharge lamp (hereinafter, the conventional high pressure discharge lamp is referred to as a "high pressure discharge lamp 1"), has a light-emitting part 3 and a pair of sealing parts 4 extending from opposite sides of the light-emitting part 3. In the light-emitting part 3, a pair of electrodes 2 are arranged so as to oppose each other, and mercury having a density of 0.15 $mg/mm^3$ or more is enclosed. The sealing parts 4 seal respective ends of the electrodes 2. The electrode 2 has a rough surface 6, and a small gap has been formed between the surface of the electrode 2 and the sealing part 4, which is made of a silica glass (e.g. see Patent Literature 1).

In a process of manufacturing the high pressure discharge lamp 1, by vibrating the sealing part 4 when the electrode 2 is sealed by the sealing part 4, a molten silica glass existing in a recessed portion 6a of the rough surface 6 of the electrode 2 is brought out of the recessed portion 6a, so that a gap is formed between the sealing part 4 and the electrode 2. The gap reduces stress concentration at an interface between the surface of the electrode 2 and the silica glass, thereby making the sealing part 4 less prone to breakage. A surface of the electrode 2 has been roughened only to form the gap, and therefore a surface of the electrode 2 only need to have a recessed portion 6a.

CITATION LIST

Patent Literature

[Patent Literature 1]
Japanese Patent No. 3480453
[Patent Literature 2]
Japanese Patent Application Publication No. 2008-282554

SUMMARY OF INVENTION

Technical Problems

The problem is that it is difficult to control a lathing process and a cylinder cutting process to roughen the surface, and thus it is not easy to roughen the surface by these processes so that a gap of an appropriate size is formed between the electrode 2 and the sealing part 4.

After studying the problem, the inventors found that a surface of the electrode 2 not having been roughened appropriately can cause a breakage of the sealing part. That is to say, if a surface of the electrode 2 is not roughened appropriately, a gap 5 as shown in FIG. 20 can be formed between the sealing part 4 and the electrode 2, and thus it becomes difficult to seal the electrode 2 sufficiently. This makes the sealing part 4 prone to breakage. In addition, if the mercury enclosed in the light-emitting part 3 enters into and accumulates in the gap 5, the pressure in the gap 5 is increased when the mercury evaporates during lighting of the lamp. The increased pressure pushes the electrode 2 toward the light-emitting part 3, and, as a result, leads to breakage of the electrode 2 and the sealing part 4.

The present invention has been achieved in view of the above problem, and aims to provide (i) an electrode used for a discharge lamp that prevents breakage of the sealing part and the electrode when being used for a high pressure discharge lamp and (ii) a method of manufacturing the electrode used for a discharge lamp.

The present invention also aims to provide a high pressure discharge lamp that prevents breakage of the sealing part and the electrode.

Furthermore, the present invention aims to provide a lamp unit and a projection image display apparatus that each include the high pressure discharge lamp preventing breakage of the sealing part and the electrode, and therefore improve reliability.

Solution to Problems

In order to achieve the above aims, one aspect of the present invention is an electrode used for a discharge lamp and having a rod-shaped part, one end of the rod-shaped part to be sealed by a sealing part of an arc tube of the discharge lamp, the other end of the rod-shaped part to be in a discharge space in the arc tube, wherein the rod-shaped part has a rough surface that is composed of a plurality of types of crystal grains each having a different surface condition due to differences in crystal orientation.

It is preferable that the surface condition of each type of crystal grain differ depending on whether and to what degree the type of crystal grain has been etched, and at least a crystal grain having a [001] crystal orientation included in the plurality of types of crystal grains have been etched.

It is also preferable that a crystal grain having a [111] crystal orientation included in the plurality of types of crystal grains have been etched less than crystal grains having any other crystal orientations.

It is also preferable that the rod-shaped part be made of high purity tungsten containing, as a subcomponent, at least one element selected from the group consisting of Al, Ca, Cr, Cu, Fe, Mg, Mn, Ni, Si, Sn, Na, K, Mo, U, and Th, with a total content of 10 ppm or less.

It is also preferable that Ry1 be 40 µm or lower, where Ry1 denotes a maximum height with respect to line roughness of a surface of the one end of the rod-shaped part, and Ry2 be in a range of 10 to 40 µm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

Another aspect of the present invention is a high pressure discharge lamp comprising: the electrode; and an arc tube made of glass, wherein the arc tube includes: a light-emitting part having therein a discharge space in which a substance is enclosed; and a sealing part connected to the light-emitting part, and the one end of the rod-shaped part is sealed by the sealing part.

Yet another aspect of the present invention is a lamp unit comprising: the high pressure discharge lamp; and a reflection mirror having a concave reflection surface, wherein the high pressure discharge lamp is built into the reflection mirror such that light emitted from the high pressure discharge lamp is reflected off the reflection surface.

Yet another aspect of the present invention is a projection image display apparatus comprising: the lamp unit; an optical unit forming an optical image by modulating light emitted from the lamp unit; and a projection device enlarging and projecting the optical image.

Yet another aspect of the present invention is a method of manufacturing an electrode used for a discharge lamp, the electrode having a rod-shaped part, one end of the rod-shaped part to be sealed by a sealing part of an arc tube of the discharge lamp, the other end of the rod-shaped part to be in a discharge space in the arc tube, the method comprising: a heat-treatment step of heat-treating a rod-shaped member to be formed as the rod-shaped part so that a surface of the rod-shaped member is composed of a plurality of types of crystal grains each having a different crystal orientation; and a chemical etching step of chemically etching the heat-treated rod-shaped member.

It is preferable that, in the heat-treatment step, the rod-shaped member be heat-treated at a temperature of 1000 to 2200° C. inclusive.

It is also preferable that the method further include a removing step of removing at least one end of the rod-shaped member after the chemical etching step, the one end of the rod-shaped member corresponding to the one end of the rod-shaped part, wherein in the chemical etching step, the rod-shaped member is etched such that Ry2 is in a range of 10 to 40 μm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

Advantageous Effects of Invention

The electrode used for a discharge lamp and the method of manufacturing the electrode used for a discharge lamp according to the present invention each prevent breakage of the sealing part and the electrode when being used for a high pressure discharge lamp.

The high pressure discharge lamp according to the present invention prevents breakage of the sealing part and the electrode.

Furthermore, the lamp unit and the projection image display apparatus according to the present invention each include the high pressure discharge lamp preventing breakage of the sealing part and the electrode, and therefore improve reliability.

BRIEF DESCRIPTION OF DRAWINGS

FIG. 13A is a sectional view of a high pressure discharge lamp in Embodiment 3 of the present invention including a longitudinal central axis thereof, as viewed from the front. FIG. 13B is a sectional view of the same, as viewed from the left.

DESCRIPTION OF EMBODIMENTS

Embodiment 1

Figure 1:
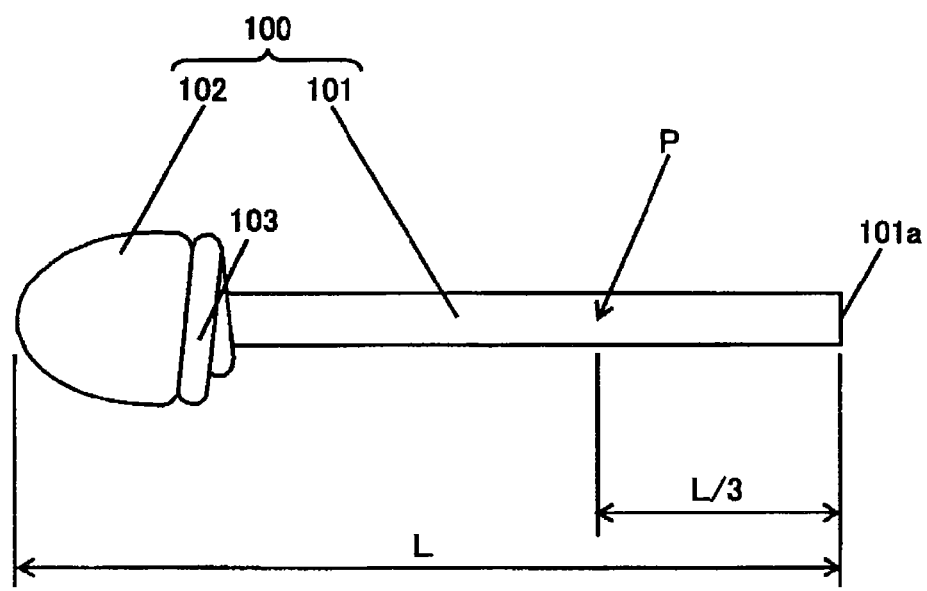
FIG. 1 is a front view of an electrode used for a discharge lamp in Embodiment 1 of the present invention.

FIG. 1 is a front view of an electrode used for a discharge lamp in Embodiment 1 of the present invention. The electrode used for a discharge lamp in Embodiment 1 of the present invention (hereinafter, referred to as an "electrode 100") is an electrode used for a high pressure discharge lamp, and has a rod-shaped part 101. One end of the rod-shaped part 101 is to be sealed by a sealing part of an arc tube of the discharge lamp (hereinafter, the end of the rod-shaped part 101 to be sealed by the sealing part is referred to as "one end"). The other end of the rod-shaped part 101 is to be in a discharge space in the arc tube (hereinafter, the end of the rod-shaped part 101 to be in the discharge space is referred to as "the other end").

As shown in FIG. 1, the electrode 100 has the rod-shaped part 101 and an electrode part 102. For example, the rod-shaped part 101 has an approximately cylindrical shape with a wire diameter of 0.5 mm, and is made of tungsten. The electrode part 102 is formed at the other end of the rod-shaped part 101. For example, the electrode part 102 has been made by fitting and fixing a double winding coil 103 (the number of turns of the coil: six) with a wire diameter of 0.3 mm onto the other end of the rod-shaped part 101. Note that a tip portion of the electrode part 102 has been melted by laser irradiation or the like so as to have an approximately hemispherical shape. The electrode part 102 may be shaved or sintered in advance so as to have an approximately hemispherical shape, spherical shape, or conical shape. Also, the rod-shaped part 101 does not need to have an approximately cylindrical shape. The rod-shaped part 101 may have an approximately polygonal column shape.

Each of the rod-shaped part 101 and the electrode part 102 may be made of high purity tungsten containing, as a subcomponent, at least one element selected from the group consisting of Al, Ca, Cr, Cu, Fe, Mg, Mn, Ni, Si, Sn, Na, K, Mo, U, and Th, with a total content of 10 ppm or less. When the electrode 100 made of such high purity tungsten is used for a high pressure discharge lamp, blackening of an arc tube (not illustrated) during a lifetime of the lamp is suppressed, and thus luminous flux maintenance factor is improved.

The electrode 100 does not need to have both of the rod-shaped part 101 and the electrode part 102, as shown in FIG. 1. For example, the electrode 100 may have only the rod-shaped part 101.

Figure 2:
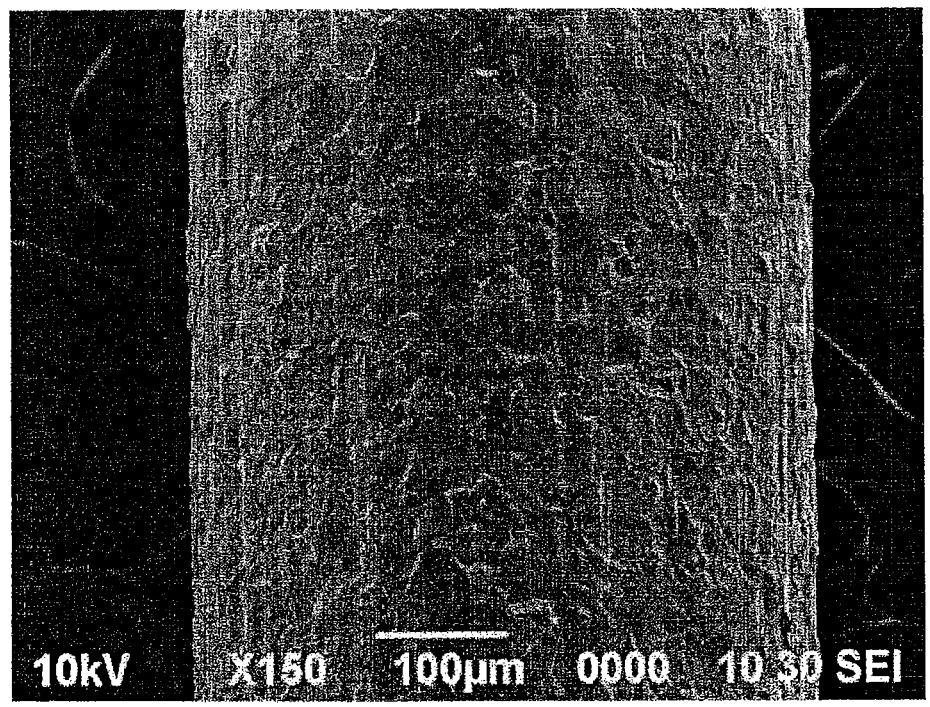
FIG. 2 is an electron micrograph of the electrode used for a discharge lamp in Embodiment 1 of the present invention taken at about 150 times magnification.

FIG. 2 is an electron micrograph of the rod-shaped part 101 taken at about 150 times magnification. The rod-shaped part 101 of the electrode 100 has a rough surface that is composed of a plurality of types of crystal grains each having a different surface condition due to differences in crystal orientation. Since a surface of the rod-shaped part 101 has been roughened appropriately, when the electrode 100 is used for a high pressure discharge lamp, breakage of the sealing part and the electrode can be prevented.

When Ry1 denotes a maximum height with respect to line roughness of a surface 101a of the one end of the rod-shaped part 101 (hereinafter, referred to as "one end surface 101a") and Ry2 denotes a maximum height with respect to line roughness in a circumferential direction of a surface of the rod-shaped part 101 at a position P, Ry1 is 40 μm or lower, and Ry2 is in a range of 10 to 40 μm inclusive. Here, the position P is a position one-third of the length of the rod-shaped part 101 in a longitudinal direction from the one end of the rod-shaped part 101. In a case of the rod-shaped part 101 having an approximately cylindrical shape as shown in FIG. 1, the surface of the rod-shaped part 101 extending along a longitudinal direction thereof indicates a circumferential surface of the rod-shaped part 101. In a case of the rod-shaped part 101 having an approximately polygonal column shape, the surface of the rod-shaped part 101 extending along a longitudinal direction thereof indicates a peripheral surface of the rod-shaped part 101.

Figure 21:
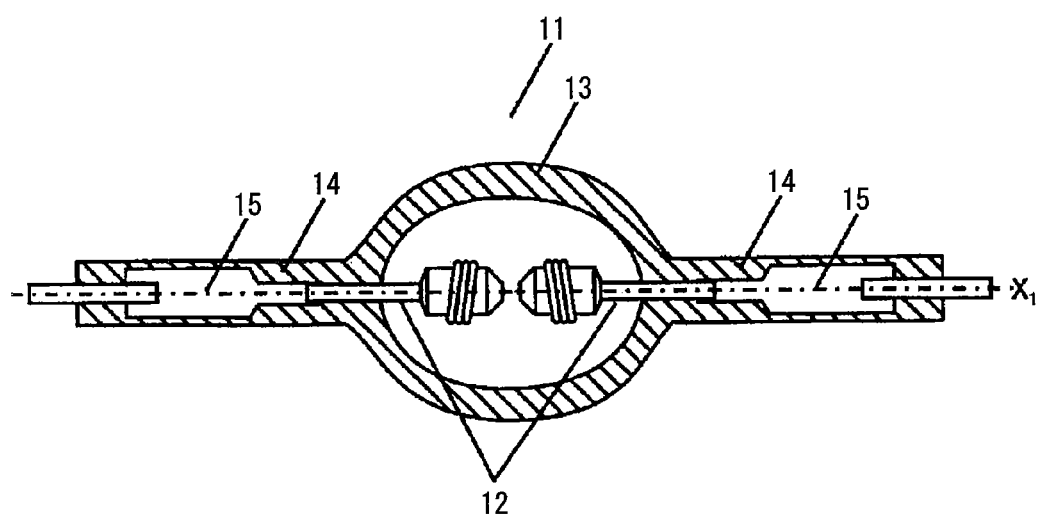
FIG. 21 is an enlarged sectional view of a chief part of the conventional high pressure discharge lamp including a longitudinal central axis $X_1$ thereof.

FIG. 21 is a sectional view of a conventional high pressure discharge lamp including a lamp axis thereof. The conventional high pressure discharge lamp (hereinafter, referred to as a "lamp 11") shown in FIG. 21 is a short arc extra-high pressure discharge lamp having, for example, the following structure. A pair of electrodes 12 are disposed so as to oppose each other in a discharge vessel 13 made from a light transmissive material and having mercury with a density of 0.15 mg/mm$^3$ or more enclosed therein. Respective ends of the electrodes 12 are welded to metal foils 15 buried in sealing parts 14 extending from opposite sides of the discharge vessel 13. The metal foil 15 and a part of the electrode 12 are sealed by a glass. The electrode 12 includes a large diameter part 13a and a reduced diameter part 13b. The large diameter part 13a is approximately axisymmetrical about a lamp axis X1, and the reduced diameter part 13b connects to the large diameter part 13a. The large diameter part 13a and the reduced diameter part 13b are integrally formed, so that they have a continuous outer surface. A part of the electrode 12 sealed by the glass has a striped surface extending along an axis X1 of the electrode 12. An entire circumference of the part has been roughened. For example, the electrode 12 is made by cutting a pure tungsten rod material with a diameter of ϕ1.4 mm using an NC lathe and then etching the entire cut material with a chemical agent (e.g. see Patent Literature 2).

After studying, however, the inventors found that, when the material is etched with a chemical agent as in the case of the lamp 11, an end surface of the electrode 12 is more likely to be eroded by the etching than a surface of the electrode 12 extending along a longitudinal direction thereof, and thus a deep recess is likely to be formed in the end surface.

Figure 3:
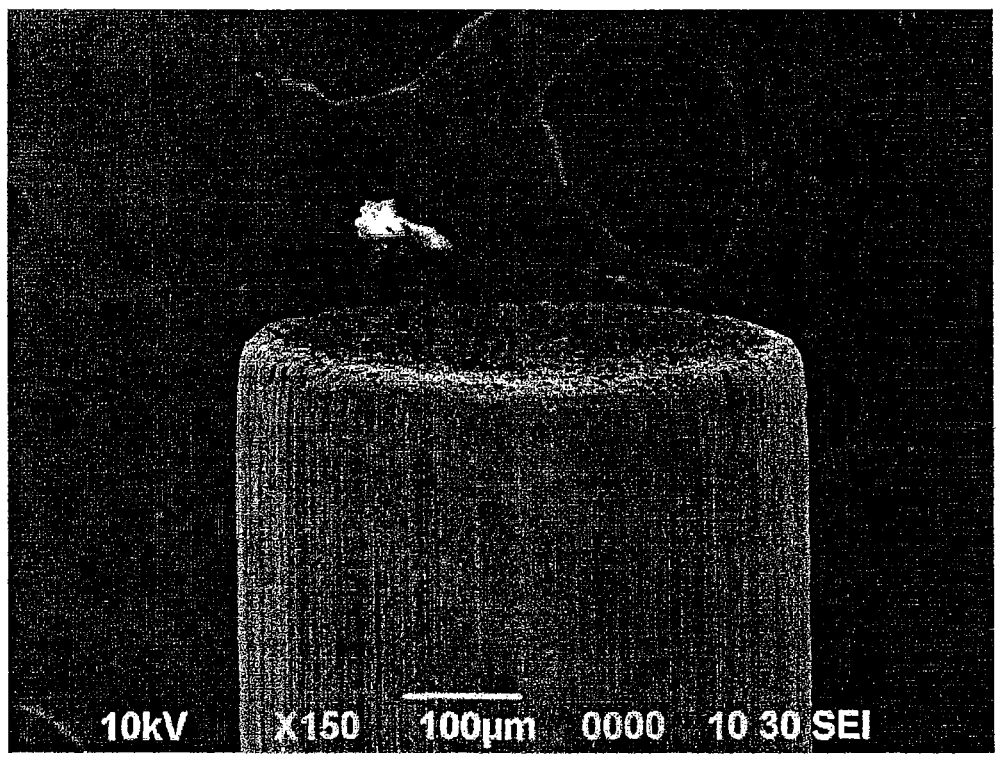
FIG. 3 is an electron micrograph of one end of a conventional electrode used for a discharge lamp taken at about 150 times magnification.
Figure 4:
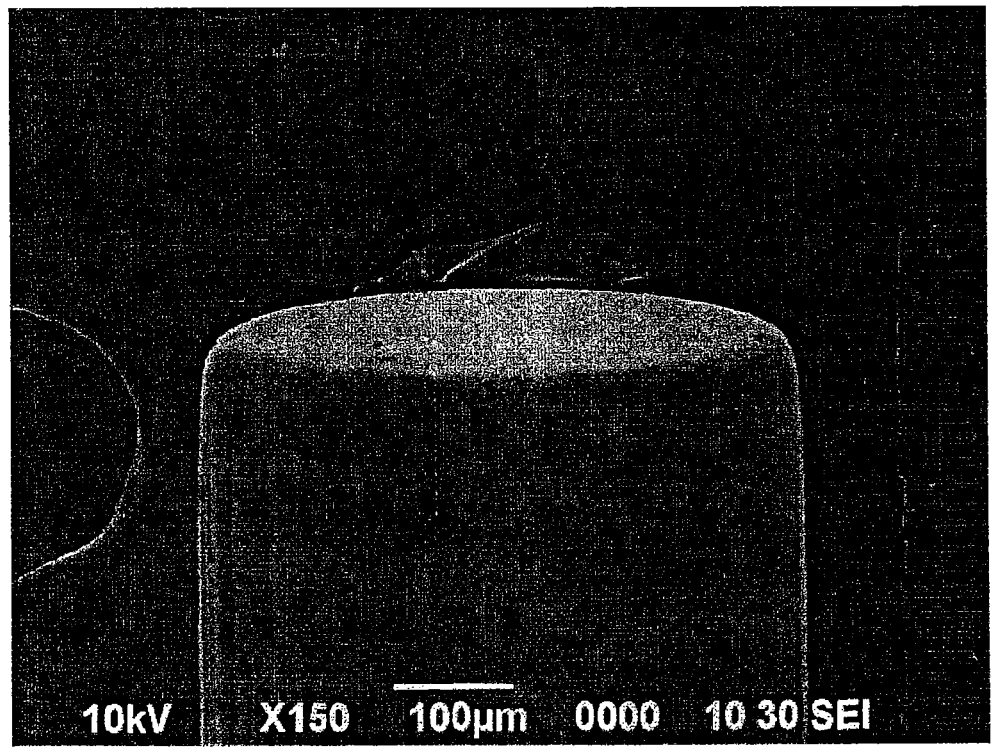
FIG. 4 is an electron micrograph of one end of the electrode used for a discharge lamp in Embodiment 1 of the present invention taken at about 150 times magnification.

In a process of manufacturing the electrode 100 according to the present invention, the one end surface 101a of the rod-shaped part 101 is more likely to be eroded by the etching than a surface of the rod-shaped part 101 extending along a longitudinal direction thereof. As a result, as shown in FIG. 3, a deep recess with, for example, a maximum height Ry1 with respect to line roughness of higher than 40 μm is formed in the one end surface of the rod-shaped part 101. If the one end surface is left unprocessed, when the electrode is used for a high pressure discharge lamp, mercury is likely to enter into and accumulate in the recess in the one end surface. The temperature of the recess in which mercury accumulates increases during lighting of the lamp, and thus the pressure increases accordingly. If the sealing part cannot withstand the increasing pressure, the increasing pressure can lead to breakage of the sealing part, or lead to breakage of the electrode by pushing the electrode toward the discharge vessel. Therefore, it is preferable to prevent mercury from attaching to the one end surface 101a of the rod-shaped part 101 of the electrode 100 by removing the one end surface in which a deep recess is formed so that Ry1 is 40 μm or lower, as shown in FIG. 4, and thus to prevent breakage of the sealing part and the electrode 100 when the electrode is used for a high pressure discharge lamp.

The "maximum height Ry1 with respect to line roughness of the one end surface 101a" is measured because it affects the probability of mercury accumulating in the one end surface 101a of the rod-shaped part 101. Instead of surface roughness, line roughness is adopted because the one end surface 101a is smaller in area than a surface of the rod-shaped part 101 extending along a longitudinal direction thereof. Note that, the surface roughness refers to roughness with respect to a surface within a predetermined area, whereas the line roughness refers to roughness with respect to a line within the predetermined area. The maximum height Ry1 is the sum of a height from an average line to the highest peak in a roughness curve and a depth from the average line to the lowest valley in the roughness curve.

Note that Ry1 is measured on a line extending from a center to a periphery of the one end surface 101a.

The position P is a "position one-third of the length of the rod-shaped part 101 in a longitudinal direction from the one end of the rod-shaped part 101". This is because, when the electrode 100 is used for a high pressure discharge lamp, a part of the rod-shaped part 101 extending from the one end surface 101a to the position P corresponds to a part sealed by the sealing part, and influences a sealing performance.

The "line roughness in a circumferential direction of a surface of the rod-shaped part 101" is measured because a longitudinal groove is likely to be formed in the surface of the rod-shaped part 101 since the rod-shaped part 101 has usually been made by elongating a material. If the line roughness in a longitudinal direction of the rod-shaped part 101 is measured, a value of Ry2 can widely fluctuate depending on a location of measurement, i.e. presence or absence of a groove.

Also, the "maximum height Ry2" is measured because it is easy to examine a surface condition of each type of crystal grain by measuring the maximum height, since the maximum height changes depending on whether and to what degree each type of crystal grain has been etched.

Ry1 and Ry2 were measured by examining a line with a length of 100 μm at about 50 times magnification, using a surface roughness measurement device (VK-8700) manufactured by Keyence Corporation.

As described above, the electrode 100 in Embodiment 1 of the present invention has a first feature that the rod-shaped part has a rough surface that is composed of a plurality of types of crystal grains each having a different surface condition due to differences in crystal orientation, and a second feature that Ry1 is 40 μm or lower, where Ry1 denotes a maximum height with respect to line roughness of a surface of the one end of the rod-shaped part, and Ry2 is in a range of 10 to 40 μm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

As a modification of the electrode 100 in Embodiment 1 of the present invention, however, the present invention may be an electrode having only one of the two features described above. That is to say, the present invention may be an electrode that has the first feature but does not have the second feature, or may be an electrode that has the second feature but does not have the first feature. Any of the electrodes in modifications can prevent breakage of the sealing part and the electrode when being used for a high pressure discharge lamp.

Note that the electrode that has the second feature but does not have the first feature as a modification of the electrode 100 in Embodiment 1 of the present invention is specifically an electrode used for a discharge lamp and having a rod-shaped part, one end of the rod-shaped part to be sealed by a sealing part of an arc tube of the discharge lamp, the other end of the rod-shaped part to be in a discharge space in the arc tube, wherein Ry1 is 40 μm or lower, where Ry1 denotes a maximum height with respect to line roughness of a surface of the one end of the rod-shaped part, and Ry2 is in a range of 10 to 40 μm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

(Experiment 1)

The inventors carried out a verification experiment to verify that the rod-shaped part 101 has a rough surface that is composed of a plurality of types of crystal grains each having a different surface condition due to differences in crystal orientation, that is, to verify that the electrode 100 has the first feature. In order to make identification of crystal orientations of a plurality of types of crystal grains easier, the inventors used, as an experimental sample, a plate-like member having a surface condition that is the same as that of the electrode 100.

Figure 5:
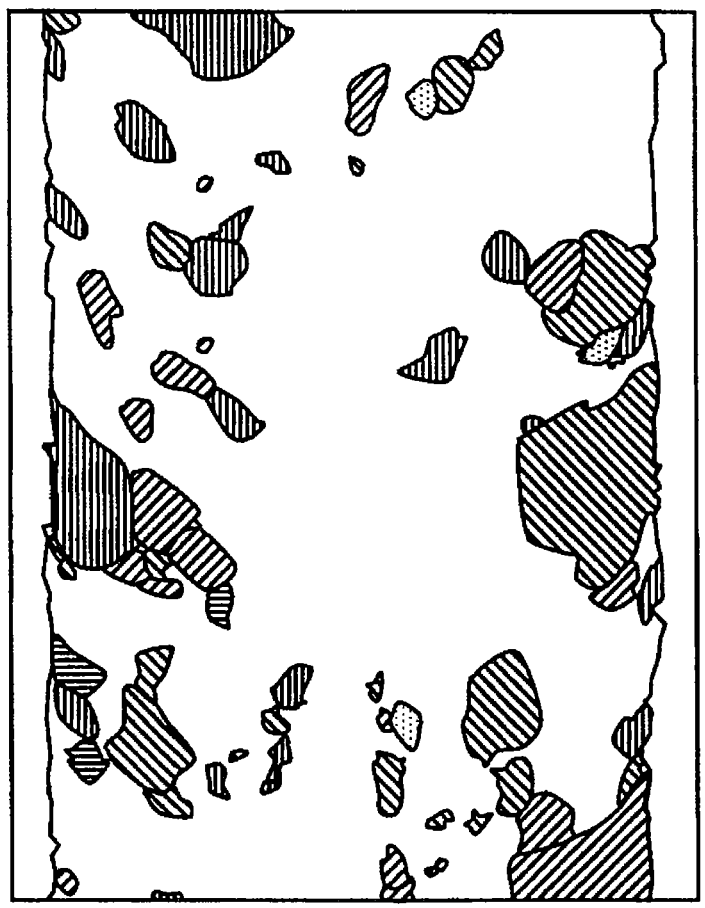
FIG. 5 shows crystal orientations of a plurality of types of crystal grains included in a surface of an experimental sample.
Figure 6:
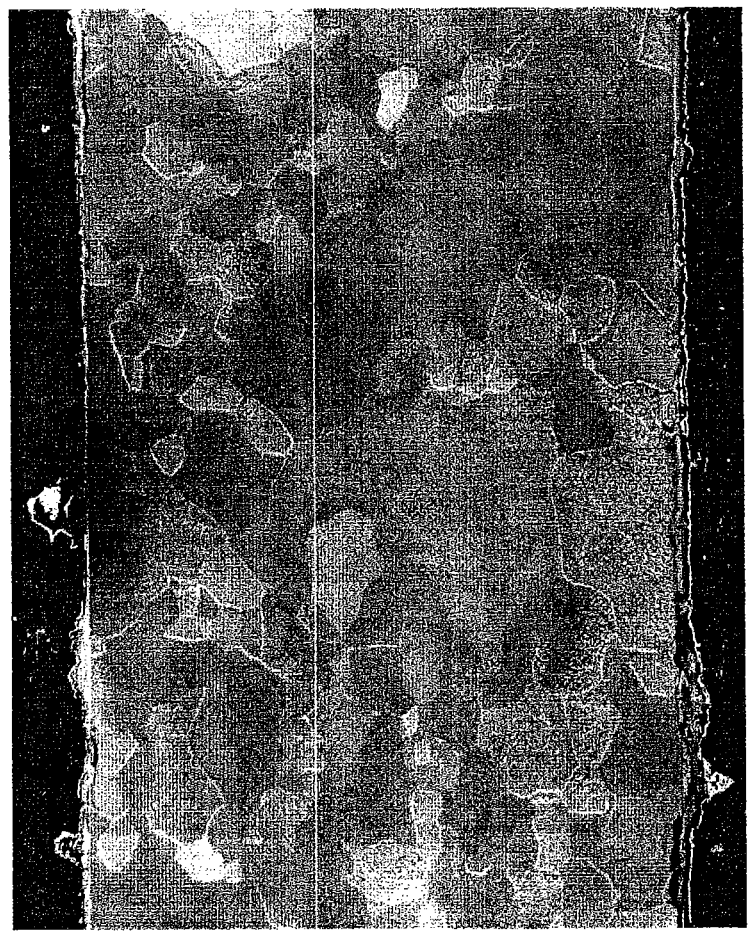
FIG. 6 is an electron micrograph of the experimental sample taken at about 100 times magnification.

FIG. 5 shows crystal orientations of a plurality of types of crystal grains included in a surface of the experimental sample. FIG. 6 is an electron micrograph of the experimental sample taken at about 100 times magnification. As shown in FIG. 5, it was verified that a plurality of types of crystal grains each having a different crystal orientation are included in the surface of the experimental sample. As shown in FIG. 6, it was also verified that a surface condition of each type of crystal grain differs due to differences in crystal orientation shown in FIG. 5. Note that FIG. 5 illustrates crystal grains each having a [001], [114], [103], [225], or crystal orientation included in the surface of the experimental sample in detail. Crystal grains having any other crystal orientations, such as a [111] crystal orientation, are not illustrated in FIG. 5. The crystal orientations shown in FIG. 5 are based on mapping applying EBSD. The map obtained using EBSD is usually composed of thousands to hundreds of thousands of pixels (measurement points) each having crystal orientation information at a location thereof. In EBSD, a grain boundary indicates, when a value (a rotation angle) of a difference in crystal orientation between pixels is a specified value or more, a boundary between the pixels. Although the value can arbitrarily be specified, the value is usually 15° or more, or 5° or more. In the present invention, the value is set to be 10° or more.

Figure 7:
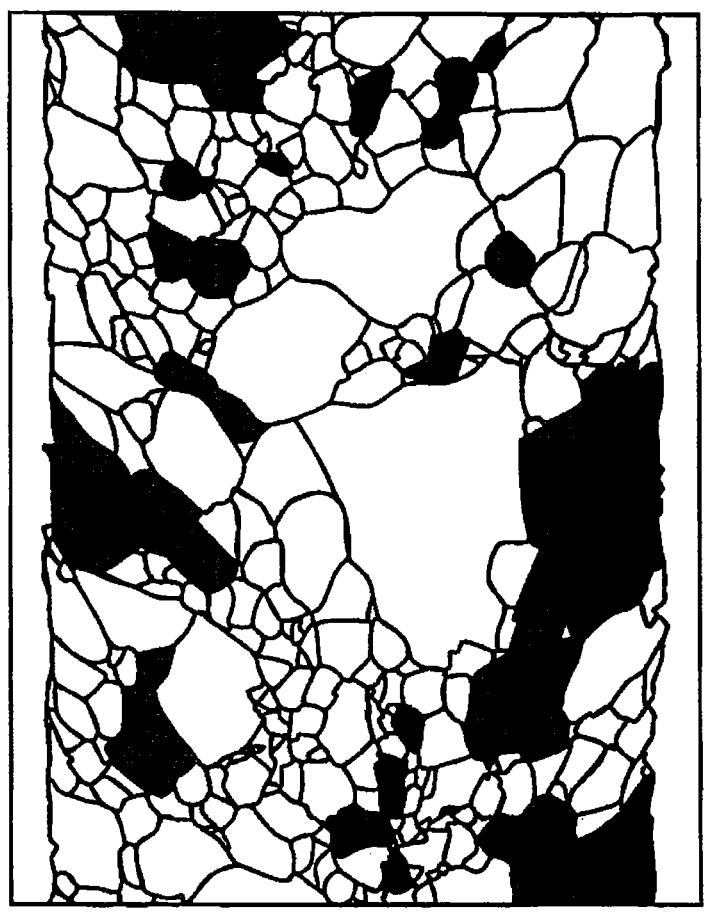
FIG. 7 shows etched crystal grains

FIG. 7 shows etched crystal grains included in the surface of the experimental sample. Here, the "etched crystal grains" indicate crystal grains having been sufficiently eroded by the etching to be identified by an electron micrograph taken at about 100 times magnification.

Figure 8:
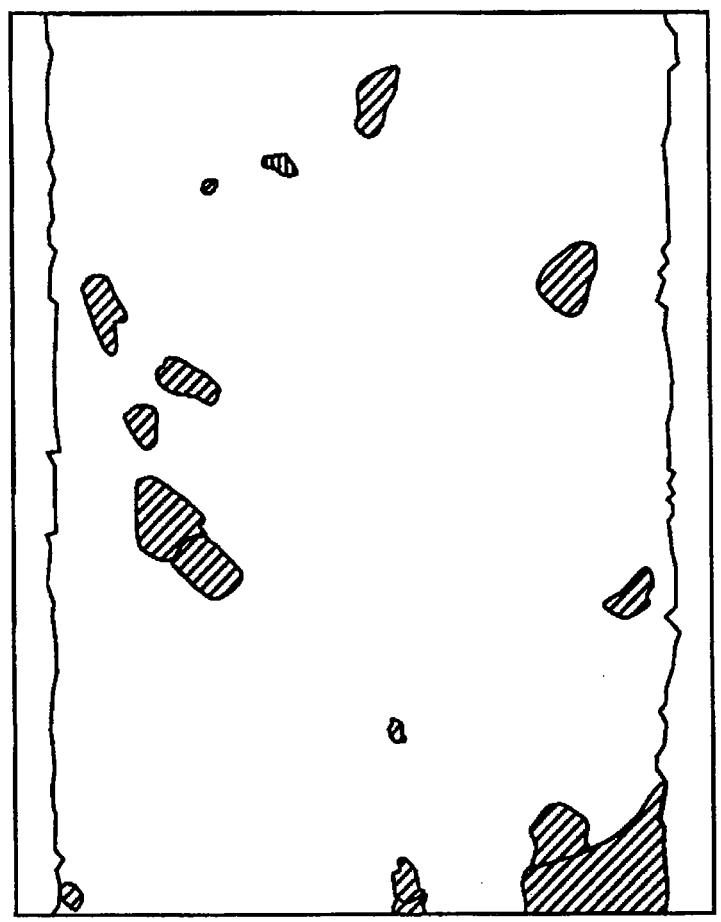
FIG. 8 shows crystal grains each having a [001] crystal orientation included in the surface of the experimental sample.
Figure 8:

FIG. 8 shows crystal grains each having a [001] crystal orientation included in the surface of the experimental sample. FIG. 8 shows only the crystal grains each having a [001] crystal orientation included in the surface of the experimental sample among the crystal grains shown in FIG. 5. As shown in FIGS. 7 and 8, it is preferable that at least a crystal grain having a [001] crystal orientation included in the surface of the rod-shaped part 101 have been etched. In this case, the surface of the rod-shaped part 101 is easily roughened by chemical etching.

Although not shown in FIGS. 5 and 6, it is preferable that a crystal grain having a [111] crystal orientation included in the surface of the rod-shaped part 101 have been etched less than crystal grains having any other crystal orientations. After studying, the inventors found that a crystal grain having the [111] crystal orientation is less likely to be etched. Therefore, if a crystal grain having the [111] crystal orientation is etched excessively, the surface of the rod-shaped part 101 are also etched excessively. This makes it difficult to control a wire diameter of the rod-shaped part 101.

Note that the crystal orientations and surface conditions of crystal grains included in the surface of the rod-shaped part 101 are preferably identified in the following procedure.

(i) Cutting the rod-shaped part 101 in a direction approximately perpendicular to a longitudinal direction thereof.

(ii) Polishing the cross-sectional surface of the rod-shaped part 101 having been cut in step (i), and examining the polished surface using an EBSP system (an OIM system [Ver.5.2] manufactured by TexSEM Laboratories, Inc.) to identify crystal orientations and surface conditions of crystal grains included in a circumferential surface of the rod-shaped part 101. As for measurement conditions, accelerating voltage, a measurement area, and a measurement interval are respectively 25 kV, 350 μm×600 μm, and 1.5 μm.

In the above-mentioned steps (i) and (ii), crystal orientations and surface conditions of crystal grains included in the surface of the rod-shaped part 101 are identified.

(Method of Manufacturing Electrode Used for Discharge Lamp)

The following describes a method of manufacturing the electrode 100 in Embodiment 1 of the present invention.

Figure 9A:
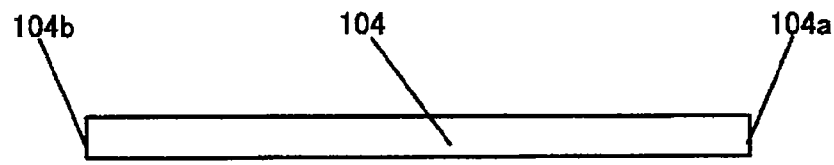
FIGS. 9A, 9B, 9C, and 9D are conceptual diagrams of a etching step, a removing step, a coiled body attaching step, a melting step, respectively.
Figure 9B:
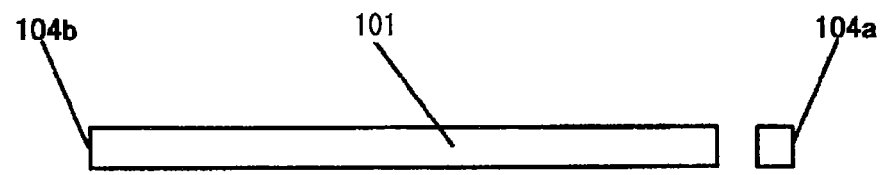

The method of manufacturing the electrode 100 in Embodiment 1 of the present invention includes a heat-treatment step, an etching step, and a removing step. In the heat-treatment step, a rod-shaped member is heat-treated so that a surface of the rod-shaped member is composed of a plurality of types of crystal grains each having a different crystal orientation. In the etching step, the heat-treated rod-shaped member is chemically etched. In the removing step, at least one end of the rod-shaped member is removed. In the etching step, the rod-shaped member is etched such that Ry2 is in a range of 10 to 40 µm inclusive, where Ry2 denotes a maximum height with respect to line roughness in a circumferential direction of a surface of the rod-shaped part at a position one-third of the length of the rod-shaped part in a longitudinal direction from the one end of the rod-shaped part. FIG. 9A is a conceptual diagram of the heat-treatment step and the etching step. FIG. 9B is a conceptual diagram of the removing step.

In a method of manufacturing the electrode that has the above-mentioned first feature but does not have the above-mentioned second feature as a modification of the electrode 100 in Embodiment 1 of the present invention, the removing step of removing at least one end of the rod-shaped part may be eliminated. In the etching step, the rod-shaped member is not necessarily etched such that Ry2 is in a range of 10 to 40 µm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

In a method of manufacturing the electrode that has the above-mentioned second feature but does not have the above-mentioned first feature as another modification of the electrode 100 in Embodiment 1 of the present invention, the heat-treatment step of heat-treating the rod-shaped member so that a surface of the rod-shaped member is composed of a plurality of types of crystal grains each having a different crystal orientation may be eliminated.

Note that the method of manufacturing the electrode that has the above-mentioned second feature but does not have the above-mentioned first feature as a modification of the method of manufacturing the electrode 100 in Embodiment 1 of the present invention is specifically a method of manufacturing an electrode used for a discharge lamp, the electrode having a rod-shaped part, one end of the rod-shaped part to be sealed by a sealing part of an arc tube of the discharge lamp, the other end of the rod-shaped part to be in a discharge space in the arc tube, the method comprising: a chemical etching step of chemically etching a rod-shaped member to be formed as the rod-shaped part such that Ry2 is in a range of 10 to 40 µm inclusive, where Ry2 denotes a maximum height with respect to line roughness in a circumferential direction of a surface of the rod-shaped part at a position one-third of the length of the rod-shaped part in a longitudinal direction from the one end of the rod-shaped part; and a removing step of removing at least one end of the rod-shaped member.

1. Heat-Treatment Step

First, as shown in FIG. 9A, a rod-shaped member 104 is prepared. The rod-shaped member 104 has a wire diameter of 0.5 mm and is made of tungsten, for example. The rod-shaped member 104 is to be formed as the rod-shaped part 101 of the electrode 100.

Next, the rod-shaped member 104 is heat-treated. The heat-treatment is carried out in a vacuum atmosphere at a temperature of 1800° C. for 60 minutes, for example. The heat-treatment makes a surface of the rod-shaped member to be composed of a plurality of types of crystal grains each having a different crystal orientation. Note that the heat-treatment may not be carried out at a temperature of 1800° C. for 60 minutes. The heat-treatment may be carried out, for example, at a temperature of 1000 to 2400° C. for 10 to 120 minutes.

2. Chemical Etching Step

Next, the rod-shaped member having been heat-treated is chemically etched. The chemical etching is carried out, for example, by immersing the rod-shaped member in a hydrogen peroxide solution ($H_2O_2$) at a temperature of 25° C. for 60 minutes. The chemical etching makes the rod-shaped member to have a rough surface that is composed of a plurality of types of crystal grains each having a different surface condition due to differences in crystal orientation.

In this example, the rod-shaped member is etched such that Ry2 is in a range of 10 to 40 µm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

When the electrode 100 has only the rod-shaped part 101, the electrode 100 is completed in the above-mentioned steps. Note that the solution used in the chemical etching is not limited to the hydrogen peroxide solution at a temperature of 25° C. For example, a boiling hydrogen peroxide solution, potassium hexacyanoferrate solution, or a mixture of caustic soda and the potassium hexacyanoferrate solution may be used. When the hydrogen peroxide solution is used, concentration of the hydrogen peroxide solution is preferably in a range of 10 to 30 wt % inclusive. In this case, a surface of the rod-shaped part 101 is roughened appropriately in an appropriate period of time.

Also, the rod-shaped member may not be immersed in the etching solution for 60 minutes. For example, the rod-shaped member may be immersed for 60 to 300 minutes.

3. Removing Step

If a deep recess is formed in one end surface 104a and the other end surface 104b of the rod-shaped member 104 by excessive etching, it is preferable to remove at least one end of the rod-shaped member 104 corresponding to the one end surface 104a by cutting with a cutting tool after the etching step, as shown in FIG. 9B. The removing step makes a maximum height with respect to line roughness of the one end surface of the rod-shaped part Ry1 to be 40 µm or lower. Note that the one end of the rod-shaped member 104 may be cut so that the deep recess is removed by the removing step. For example, the rod-shaped member 104 may be cut at a position 1 mm from the one end of the rod-shaped member 104 in a longitudinal direction thereof.

Note that the at least one end does not need to be cut with a cutting tool. The at least one end may be cut by laser, or may be removed by being polished.

When the electrode 100 has only the rod-shaped part 101, the electrode 100 is completed in the above-mentioned steps.

4. Other Steps

When the electrode 100 has not only the rod-shaped part 101 but also the electrode part 102, the following steps are additionally performed. The additional steps are described with use of FIGS. 9C and 9D.

4-1. Coiled Body Attaching Step

Figure 9C:
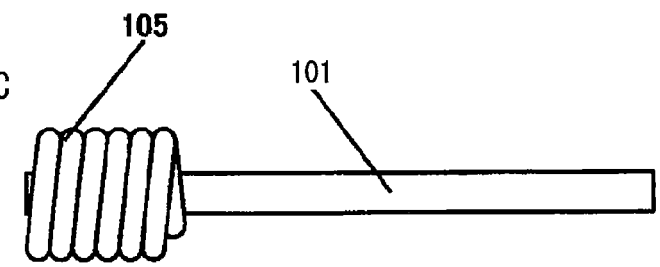

First, as shown in FIG. 9C, a coiled body 105 is formed by winding a metal wire that, for example, has a wire diameter of 0.3 mm and is made of tungsten around the rod-shaped part 101. Note that the coiled body 105 corresponds to the electrode part 102 of the completed electrode 100.

4-2. Melting Step

Figure 9D:
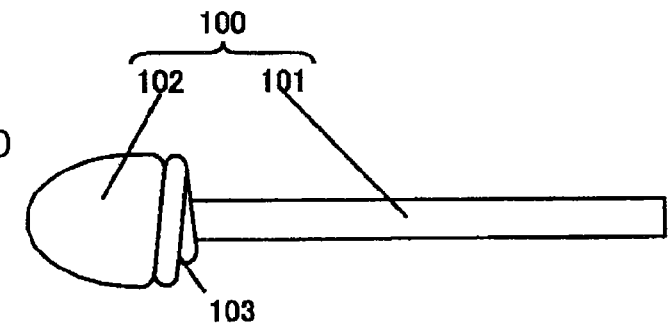

Next, as shown in FIG. 9D, a tip portion of the coiled body 105 is melted. For example, the melting step is specifically performed in the following manner. A distance between a tip of the coiled body 105 and an end of an electrode (cathode) of an argon plasma welding device (not illustrated) is set and held to be 1.0 mm. Then, arc discharge is produced. The tip portion of the coiled body 105 is melted by the arc discharge, and thus the electrode part 102 is completed. Note that, in the melting step, it is preferable that arc discharge be intermittently produced, and at least one cooling-off period be provided. This makes it easier to control a shape of the electrode part 102 and also prevents formation of a void in the tip portion of the electrode part 102, compared with a case where the tip portion is melted by arc discharge produced continuously.

The electrode 100 having the electrode part 102 is completed in the above-mentioned steps.

(Experiment 2)

The inventors carried out an experiment to verify that the breakage of the sealing part is prevented when the electrode 100 is used for a high pressure discharge lamp. Used in Experiment 2 was the electrode 100 that has the above-mentioned first feature but does not have the above-mentioned second feature. In Experiment 2, whether the sealing part of the high pressure discharge lamp produced as an experimental sample is damaged or not was visually checked. Twenty experimental samples were produced for each condition, and a status of each experimental sample after initial lighting was visually checked. When none of the twenty samples were damaged, the samples were determined to be desirable (represented by a circle in Table 1). When one or more samples were damaged, the samples were determined to be undesirable (represented by a cross in Table 1).

The experimental samples were produced in the following procedure.

(1) A rod-shaped member made of tungsten was heat-treated in a vacuum atmosphere at a temperature of 500, 1000, 1200, 1400, 1600, 1800, 2000, 2200, or 2400° C. for 60 minutes. For purpose of comparison, a rod-shaped member not having been heat-treated was also prepared.

(2) After the above-mentioned step (1), the etching step was performed by immersing the rod-shaped member in 10 or 30 wt % hydrogen peroxide solution at a temperature of 25° C. for an hour, or in 10 or 30 wt % hydrogen peroxide solution at a temperature of 50° C. for an hour. For purpose of comparison, a rod-shaped member not having been etched was also prepared.

(3) After the above-mentioned step (2), the rod-shaped member was heat-treated in a vacuum atmosphere at a temperature of 1800° C. for 30 minutes. Note that the heat-treatment in step (3) aims to remove impurities from and to degas a surface of a metal member, and thus not necessary for the present invention. The heat-treatment in step (3) has little effect on surface roughness of the rod-shaped member.

(4) After the above-mentioned steps (1) to (3), the rod-shaped member was sealed, as an electrode, by a sealing part of an arc tube, and thus a high pressure discharge lamp was produced.

Table 1 shows results of Experiment 2.

TABLE 1

| | | not etched | etched (1 h, 25° C.) | | etched (1 h, 50° C.) | |
|---|---|---|---|---|---|---|
| | | | 10 wt % | 30 wt % | 10 wt % | 30 wt % |
| heat-treatment temperature | not heat-treated | x | x | x | x | x |
| | 500° C. | x | x | x | x | x |
| | 1000° C. | x | ○ | ○ | ○ | ○ |
| | 1200° C. | x | ○ | ○ | ○ | ○ |
| | 1400° C. | x | ○ | ○ | ○ | ○ |
| | 1600° C. | x | ○ | ○ | ○ | ○ |
| | 1800° C. | x | ○ | ○ | ○ | ○ |
| | 2000° C. | x | ○ | ○ | ○ | ○ |
| | 2200° C. | x | ○ | ○ | ○ | ○ |
| | 2400° C. | x | x | x | x | x |

Figure 10:
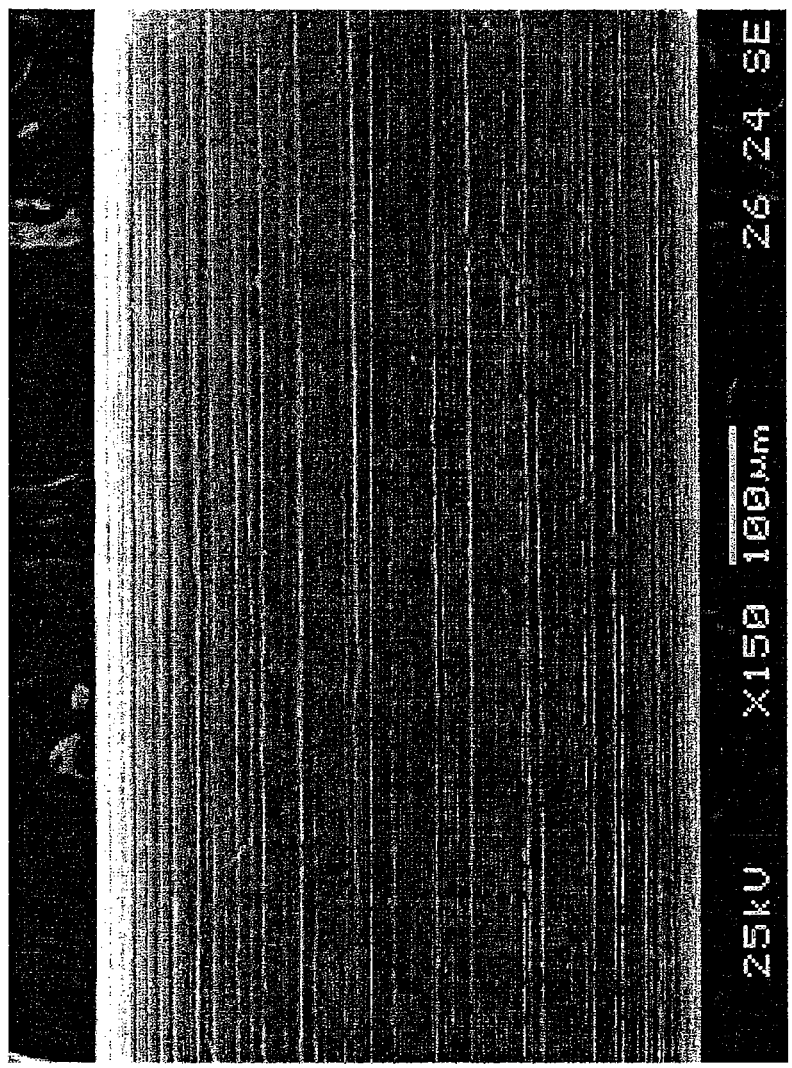
FIG. 10 is an electron micrograph of a rod-shaped member that has been manufactured without performing a heat-treatment step and the etching step, taken at about 100 times magnification.

As shown in Table 1, some of sealing parts that each seal a rod-shaped member not having been heat-treated, not having been etched, or not having been heat-treated and not having been etched were damaged. FIG. 10 is an electron micrograph of the rod-shaped member sealed by the damaged sealing part taken at about 100 times magnification. As shown in FIG. 10, a surface of the rod-shaped member has not been roughened appropriately. Therefore, it is considered that the rod-shaped member could not have an appropriate contact with the sealing part and thus was distorted by thermal stress introduced when the sealing part sealed the rod-shaped member, and, as a result, the sealing part was damaged.

In contrast, sealing parts that each seal a rod-shaped member having been heat-treated and then etched were not damaged, with the exception of sealing parts that each seal a rod-shaped member having been heat-treated at a temperature of 500 or 2400° C. It is considered that this is because the heat-treatment has caused the rod-shaped member to have a surface that is composed of a plurality of types of crystal grains each having a different crystal orientation. The differences in crystal orientation led to differences in etching degree. As a result, the surface of the rod-shaped member has been roughened appropriately. It is considered that a temperature of the heat-treatment is preferably more than 500 and lower than 2400° C., and is more preferably 1000 to 2200° C. inclusive.

It is considered that the sealing parts that each seal a rod-shaped member having been heat-treated at a temperature of 500° C. and then etched were damaged for the following reason. Since having been heat-treated at a temperature of 500° C., which is a temperature not high enough to heat-treat the rod-shaped member, a surface of the rod-shaped member was not composed of a plurality of types of crystal grains each having a different crystal orientation. Therefore, even when etching was carried out after the heat-treatment, it was difficult to roughen the surface of the rod-shaped member appropriately. On the other hand, it is considered that the sealing parts that each seal a rod-shaped member having been heat-treated at a temperature of 2400° C. and then etched were damaged for the following reason. Since having been heat-treated at a temperature of 2400° C., which is an excessively high temperature, a surface of the rod-shaped member was not composed of a plurality of types of crystal grains each having a different crystal orientation. Therefore, even when etching was carried out after the heat-treatment, it was difficult to roughen the surface of the rod shaped member appropriately.

Experiment 2 shows that the breakage of the sealing part is prevented when the electrode 100 is used for a high pressure discharge lamp.

(Experiment 3)

Figure 20:
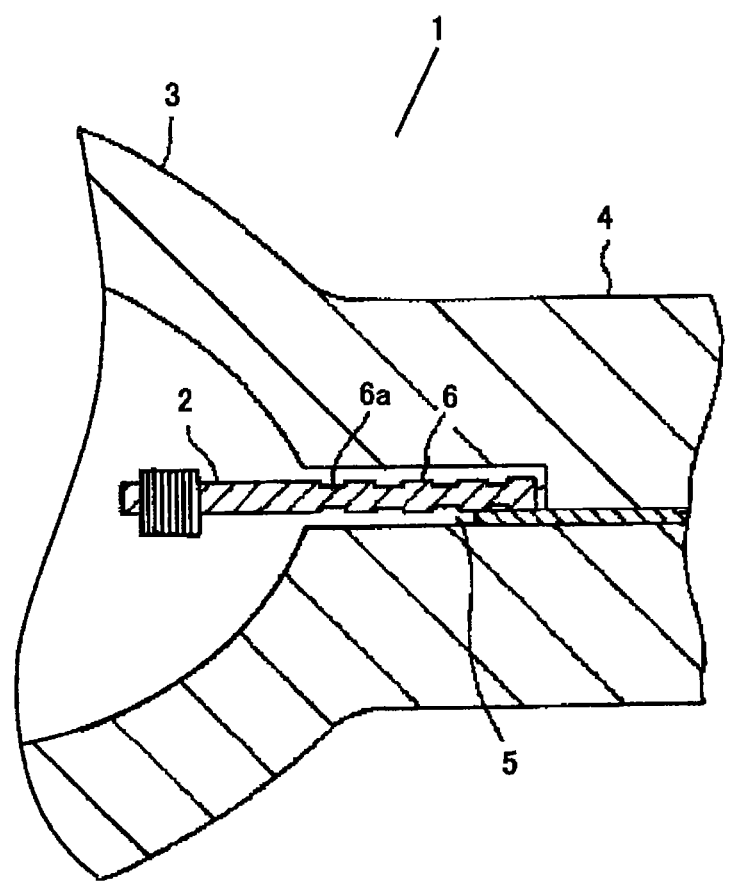
FIG. 20 is an enlarged sectional view of a chief part of a conventional high pressure discharge lamp including a longitudinal central axis thereof.

The inventors also carried out an experiment to verify that the breakage of the electrode is prevented when the electrode 100 is used for a high pressure discharge lamp. Used in Experiment 3 was the electrode 100 that has the above-mentioned first feature but does not have the above-mentioned second feature. In Experiment 3, the samples that each include the electrode determined to be desirable (represented by a circle in Table 1: working example) in Experiment 2 were repeatedly turned on for 10 minutes and then turned off for 10 minutes. After the samples were turned on a thousand times, states of the electrodes were visually checked, and the number of samples in each of which an electrode was detached from a sealing part was counted. Note that, as a comparative example, samples that each include an electrode having a rough surface formed by a lathing process and have a small gap between the electrode and the sealing part, similarly to the high pressure discharge lamp 1 shown in FIG. 20, were also prepared. Table 2 shows results of Experiment 3.

TABLE 2

|  | the number of damaged electrodes in each example |
|---|---|
| working example | 0/20 |
| comparative example | 17/20 |

As shown in Table 2, no electrode in the working example was damaged. In contrast, 17 out of 20 electrodes in the comparative example were damaged. It is considered that the electrodes in the comparative example were damaged for the following reason. Mercury accumulated in a recess in a surface of each of the electrodes in the comparative example. When the lamp was turned on, the pressure was increased in a small gap formed between the electrode and the sealing part, and the increased pressure pushed the electrode so as to be detached from the sealing part, and as a result, damaged the electrode.

It is considered that the electrodes in the working example were not damaged for the following reason. The rod-shaped part of each of the electrodes in the working example has a rough surface that is composed of a plurality of types of crystal grains each having a different surface condition due to differences in crystal orientation. This caused the rod-shaped part to have an appropriate contact with the sealing part, and thus made it difficult for mercury to enter into a gap between the rod-shaped part and the sealing part. As a result, the breakage of the electrode was prevented.

The Experiment 3 shows that the breakage of the electrode is prevented when the electrode 100 is used for a high pressure discharge lamp.

As set forth the above, when the electrode used for a discharge lamp in Embodiment 1 of the present invention is used for a high pressure discharge lamp, breakage of the sealing part and the electrode is prevented.

Note that it is preferable that a minimum diameter of a crystal grain included in the surface of the rod-shaped part 101 be 5 μm or larger, and a maximum diameter of the crystal grain be 200 μm or smaller. In this case, it becomes easy to roughen a surface of the rod-shaped part 101 appropriately. Furthermore, it is more preferable that a minimum diameter of a crystal grain included in the surface of the rod-shaped part 101 be 5 μm or larger and a maximum diameter of the crystal grain be 100 μm or smaller. In this case, it becomes easier to roughen the surface of the rod-shaped part 101 appropriately.

The minimum and maximum diameters of a crystal grain included in the surface of the rod-shaped part 101 can be measured, for example, by using an electron micrograph of the surface of the rod-shaped part 101 taken at about 150 times magnification and a light micrograph of the etched surface of the rod-shaped part 101 taken at about 150 times magnification.

(Experiment 4)

The inventors also carried out an experiment to verify that the breakage of the electrode is prevented when the electrode 100 wherein Ry1 is 40 μm or lower, where Ry1 denotes a maximum height with respect to line roughness of a surface of the one end of the rod-shaped part, and Ry2 is in a range of 10 to 40 μm inclusive, where Ry2 denotes a maximum height with respect to line roughness in a circumferential direction of a surface of the rod-shaped part at a position one-third of the length of the rod-shaped part in a longitudinal direction from the one end of the rod-shaped part, namely the electrode 100 having the above-mentioned second feature, is used for a high pressure discharge lamp. Used in Experiment 4 is the electrode 100 that has the above-mentioned second feature but does not have the above-mentioned first feature.

The inventors produced a variety of electrodes used for a discharge lamp each having different values of Ry1 and Ry1 by changing etching conditions of the rod-shaped member and conditions regarding whether to remove an end of the rod-shaped member after the etching. The inventors then produced, as experimental samples, high pressure discharge lamps by using the produced electrodes. When one end of the rod-shaped member has been removed, the high pressure discharge lamp was produced such that the removed end is sealed by the sealing part of the high pressure discharge lamp.

Figure 11:
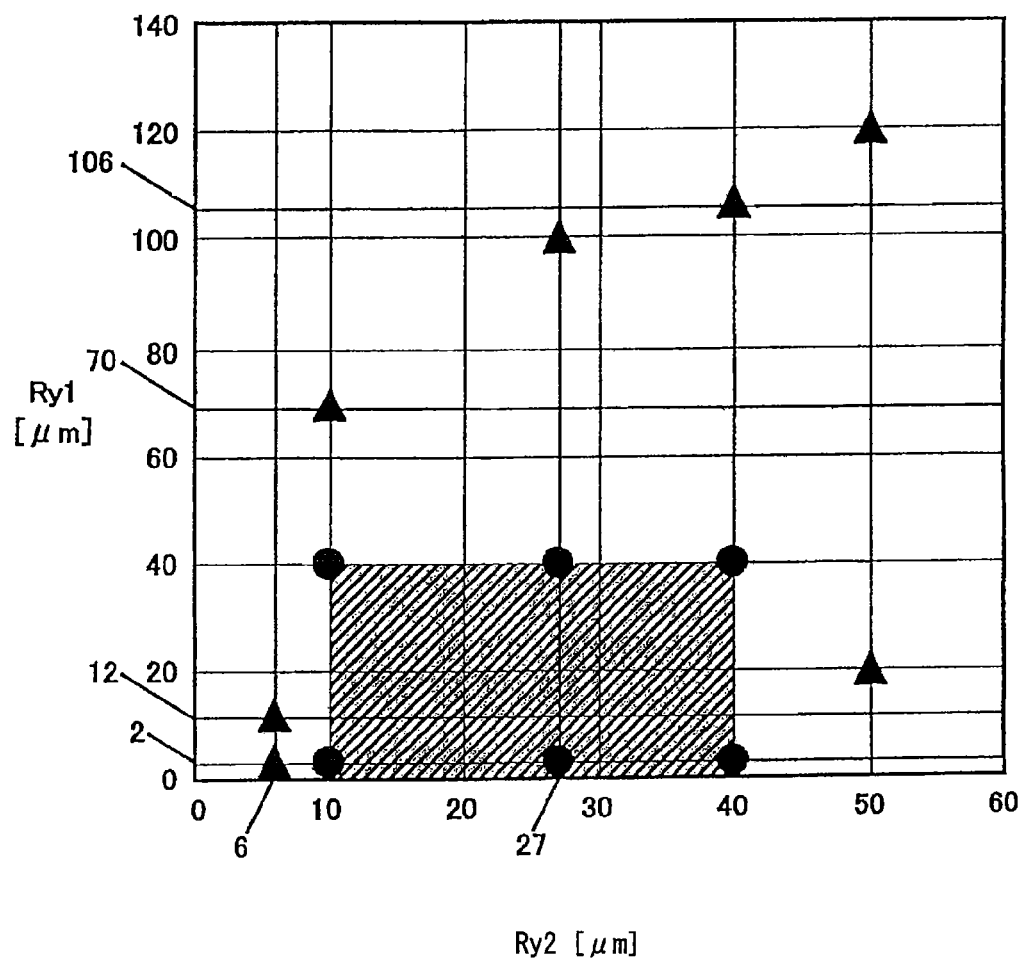
FIG. 11 shows experimental results regarding breakage of an electrode that varies depending on values of Ry1 and Ry2.

Each of the experimental samples was turned on for 10 minutes and then turned off for 10 minutes. After being turned on a thousand times, the experimental samples were visually checked to identify an experimental sample in which the electrode and the sealing part are damaged. When none of the twenty samples includes the damaged electrode and sealing part, the samples were determined to be desirable (represented by a black circle in FIG. 11). When one or more samples include the damaged electrode and sealing part, the samples were determined to be undesirable (represented by a black triangle in FIG. 11). FIG. 11 shows results of Experiment 4.

As shown in FIG. 11, in cases where Ry1 is 2 μm and Ry2 is 10 μm, where Ry1 is 2 μm and Ry2 is 27 μm, where Ry1 is 2 μm and Ry2 is 40 μm, where Ry1 is 40 μm and Ry2 is 10 μm, where Ry1 is 40 μm and Ry2 is 27 μm, and where Ry1 is 40 μm and Ry2 is 40 μm, samples were determined to be desirable. In these cases, breakage of the electrode and the sealing part was prevented. These experimental samples are discharge lamps that each include an electrode manufactured by etching a rod-shaped member and then removing at least one end of the rod-shaped member. In these cases, since the removed end of the rod-shaped member has been sealed by the sealing part of the high pressure discharge lamp, mercury was less likely to attach and accumulate in an end surface of the rod-shaped member. Therefore, even when the high pressure discharge lamp was repeatedly turned on and off, breakage of the electrode caused by a mercury vapor pressure was prevented.

In contrast, in cases where Ry1 is 70 μm and Ry2 is 10 μm, where Ry1 is 100 μm and Ry2 is 27 μm, where Ry1 is 106 μm and Ry2 is 40 μm, and where Ry1 is 120 μm and Ry2 is 50 μm, breakage of the electrode could not be prevented. These experimental samples are discharge lamps that each include an electrode manufactured by etching a rod-shaped member and not removing an end of the rod-shaped member. In these cases, mercury was likely to attach and accumulate in an end surface of the rod-shaped member sealed by the sealing part of the high pressure discharge lamp. Therefore, when the high pressure discharge lamp was repeatedly turned on and off, the electrode was broken by a mercury vapor pressure pushing the electrode toward the central portion of the arc tube.

Also in cases where Ry1 is 2 μm and Ry2 is 6 μm, where Ry1 is 12 μm and Ry2 is 6 μm, and where Ry1 is 20 μm and Ry2 is 50 μm, breakage of the electrode could not be prevented. In these cases, since a surface of the rod-shaped member extending along a longitudinal direction has not been etched sufficiently or has been etched excessively, the sealing part of the high pressure discharge lamp could not relieve stresses caused by a difference in thermal expansion coefficient between the rod-shaped member and the sealing part, and was broken. With the breakage of the sealing part, the electrode was broken.

As a result, it was found that the breakage of the electrode can be prevented when Ry1 is 40 μm or lower and Ry2 is in a range of 10 to 40 μm inclusive. Note that, although a minimum value of Ry1 is 2 μm in the experimental results, the value of Ry1 can be lower than 2 μm by using an appropriate method of removing an end of the rod-shaped part. It is easy to assume from the experimental results that the value of Ry1 is preferably as low as possible to prevent mercury from attaching and accumulating in an end surface of the rod-shaped part.

The value of Ry1 is more preferably in a range of 2 to 40 μm inclusive. In this case, since an end of the rod-shaped member can be removed in a simple method, for example, by cutting with a cutting tool, the productivity of the electrode used for a discharge lamp can be improved.

Furthermore, for example, by barrel polishing the removed end, the value of Ry1 can be 20 μm or lower.

When the value of Ry1 is lower than 40 μm and the value of Ry2 is in a range of 10 to 40 μm inclusive as described above, the prevention of the breakage of the electrode 100 and the sealing part is ensured when the electrode 100 is used for the high pressure discharge lamp.

Embodiment 2

Figure 12:
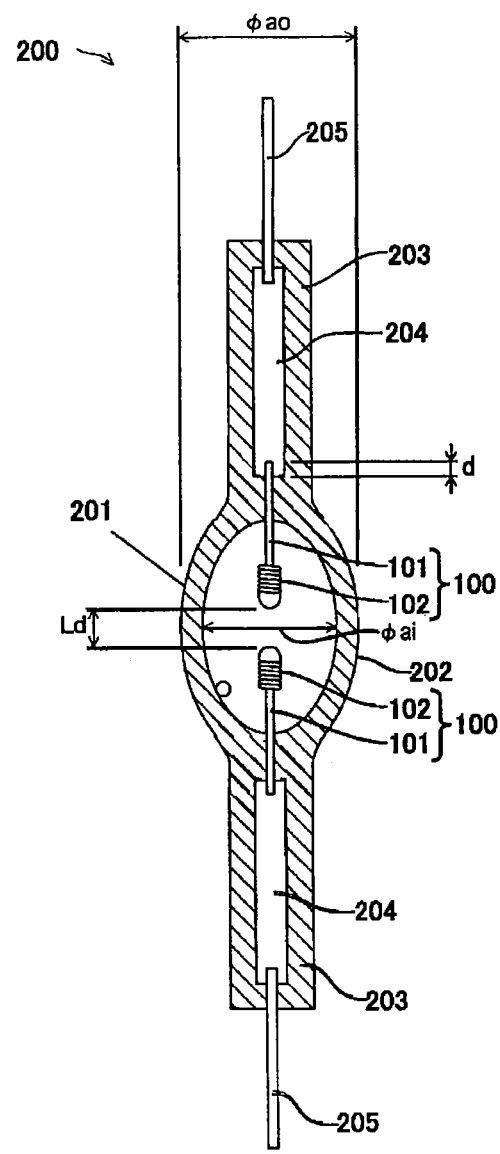
FIG. 12 is a sectional view of a high pressure discharge lamp in Embodiment 2 of the present invention including a longitudinal central axis thereof.

FIG. 12 is a sectional view of a high pressure discharge lamp in Embodiment 2 of the present invention including a longitudinal central axis thereof. The high pressure discharge lamp in Embodiment 2 of the present invention (hereinafter, referred to as a "high pressure discharge lamp 200") includes a glass arc tube 201 in which the electrode 100 is disposed. The arc tube 201 includes a light-emitting part 202 and a sealing part 203. The light-emitting part 202 has therein a discharge space in which a substance is enclosed. The sealing part 203 is connected to the light-emitting part 202. Note that, in FIG. 12, the electrode 100, a metal foil 204 (described later), and a lead wire 205 (described later) are not shown in cross section for the sake of convenience.

The light-emitting part 202 is a part of the arc tube 201 having the discharge space therein. The light-emitting part 202 is made of silica glass, which is a light transmissive material, and has a spherical shape or an ellipsoidal shape. For example, the light-emitting part 202 has an approximately spherical shape with an outer diameter of about 12 mm and an inner diameter of about 5 mm. The light-emitting part 202 has therein a discharge space with a capacity of about 0.1 cm$^3$. Note that the outer diameter and the inner diameter of the light-emitting part 202, and the capacity of the discharge space are not particularly limited. They may be changed appropriately depending on specifications of the high pressure discharge lamp 200. Although a double-end high pressure discharge lamp in which both ends are sealed is employed in Embodiment 2, a single-end high pressure discharge lamp may be employed.

The light-emitting part 202 is filled with a predetermined amount of mercury (Hg) as a luminescent material, rare gas as a starting aid, and halogen material.

When the light-emitting part 202 with a capacity of about 0.1 cm$^3$ is filled with mercury as a luminescent material with a density of about 0.3 mg/mm$^3$, a rare gas as a starting aid at a pressure of about 30 kPa, and bromine as a halogen material with a density of about $10^{-7}$ to $10^{-2}$ μmol/mm$^3$, a mercury vapor pressure during lighting of the lamp is approximately 300 atmospheres.

Examples of the rare gas are argon (Ar), krypton (Kr), xenon (Xe), and a mixture of at least two of them. Examples of the halogen material are iodine (I), bromine (Br), chlorine (Cl), and a mixture of at least two of them. The mercury vapor pressure during lighting of a lamp of the present invention is not limited to approximately 300 atmospheres. The mercury vapor pressure may be appropriately adjusted by changing an amount of mercury enclosed in the light-emitting part 202.

The sealing part 203 is connected to the light-emitting part 202. The sealing part 203 has been formed by fixing a molten silica glass by applying pressure, and has an approximately cylindrical shape. The sealing part 203 hermetically seals the light-emitting part 202. The sealing part 203 is formed, for example, by a well known shrink seal method. The method of forming the sealing part 203, however, is not particularly limited. Similarly, an outer diameter, a length, and a shape of the sealing part 203 are not particularly limited. They may be changed depending on specifications of the high pressure discharge lamp 200.

In the light-emitting part 202, a pair of electrodes 100 made, for example, of tungsten are disposed so as to oppose each other. One end of the electrode 100 located on a side of the electrode part 102 is in the discharge space. The other end of the electrode 100 located on a side of the rod-shaped part 101 is connected to a metal foil 204 (described later) by welding and is sealed by the sealing part 203. In terms of brightness, in case of a short arc high pressure discharge lamp for example, it is preferable that a distance Ld between the pair of electrodes 100 be appropriately adjusted to be in a range of 0.5 to 2.0 mm inclusive so that each of the electrodes is close to a point source (see FIG. 12).

At least one end of the rod-shaped part 101 of the electrode 100 is sealed by the sealing part 203. In the sealing part 203, an outer circumference of an end of the rod-shaped part 101 that is located on the opposite side of the electrode part 102 is connected to an end of the metal foil 204. The metal foil 204 is a metal member made of molybdenum or the like, and has a rectangular shape, for example. One end of the metal foil 204 located on a side of the light-emitting part 202 overlays an end of the rod-shaped part 101, and is buried in the sealing part 203. The other end of the metal foil 204 is connected to an end of the lead wire 205. The rod-shaped part 101 and the metal foil 204, and the metal foil and the lead wire are each connected by resistance welding, laser welding, arc welding or the like. It is preferable that the rod-shaped part 101 and the metal foil 204 be connected with each other and then buried in the sealing part 203 as described above so as to make the discharge space airtight. Note that a part of the rod-shaped part 101 connected to the metal foil 204 is not particularly limited. It is preferable, however, that a length of a connected part (i.e. a shortest distance d between an end of the metal foil 204 on a side of the electrode 100 and an end of the rod-shaped part 101 on a side of the metal foil 204) be appropriately adjusted to be in a range of 1.0 to 1.5 mm inclusive.

Examples of specific numerical values of the high pressure discharge lamp in Embodiment 2 are as follows.

An inner diameter ($\phi$ai of the light-emitting part in the middle portion thereof: 5 mm An outer diameter ($\phi$ao of the light-emitting part in the middle portion thereof: 12 mm Capacity of the light-emitting part: 0.1 cm$^3$ A distance between electrodes Ld: 1.2 mm An amount of enclosed mercury: 0.35 mg/mm$^3$ An amount of enclosed argon: 30 kPa (at a temperature of 25° C.)

An amount of enclosed bromine: 0.5×10$^{-3}$ μmol

Note that, although the electrode 100 has the rod-shaped part 101 and the electrode part 102 in FIG. 12, the electrode 100 may only have the rod-shaped part 101.

As set forth the above, with the structure of the high pressure discharge lamp 200 in Embodiment 2 of the present invention, breakage of the sealing part 203 and the electrode 100 can be prevented.

Embodiment 3

FIG. 13A is a sectional view of a high pressure discharge lamp in Embodiment 3 of the present invention including a longitudinal central axis thereof, as viewed from the front. FIG. 13B is a sectional view of the same, as viewed from the left. The high pressure discharge lamp in Embodiment 3 of the present invention (hereinafter, referred to as a "high pressure discharge lamp 300") is substantially the same as the high pressure discharge lamp 200 except that a cavity 301 is formed in at least one sealing part 203 and an antenna 302 is provided so as to surround a part of the sealing part 203 in which the cavity 301 is formed. Therefore, the cavity 301 and the antenna 302 will be described in detail below, and the other elements are not described here. Note that, in FIG. 13A, the electrode 100, the metal foil 204, and the lead wire 205 are not shown in cross section for the sake of convenience. Also, in FIG. 13B, the electrode 100 and the lead wire 205 are not shown in cross section for the sake of convenience.

The cavity 301 is formed in at least one sealing part 203. At least a rare gas is enclosed in the cavity 301. Note that the same gas as that enclosed in the light-emitting part 202 (e.g. a rare gas and mercury) may be enclosed in the cavity 301. The cavity 301 may contain therein at least one of a barium oxide and thoriated tungsten. In this case, it becomes easy to produce discharge between the metal foil 204 and the antenna 302, as the barium oxide and thoriated tungsten are likely to emit electrons.

The antenna 302 is provided so as to surround a part of the sealing part 203 in which the cavity 301 is formed. For example, the antenna 302 is made of an alloy of iron and chromium. One end of the antenna 302 is wound around the part of the sealing part three turns, and the other end of the antenna 302 is connected to the outer lead wire 205. The antenna 302 may not be made of the alloy of iron and chromium. A metal wire made, for example, of molybdenum or tungsten may be used as the antenna 302.

In addition, a second antenna (not illustrated) acting as a trigger may be provided so as to surround an end of the sealing part 203 located on a side of the light-emitting part 202 (so as to surround a part of the sealing part 203 in which the rod-shaped part 101 is buried).

As set forth the above, with the structure of the high pressure discharge lamp 300 in Embodiment 3 of the present invention, breakage of the sealing part 203 and the electrode 100 can be prevented. In addition, by providing the cavity 301 and the antenna 302, it becomes easy to initiate discharge.

Embodiment 4

Figure 14:
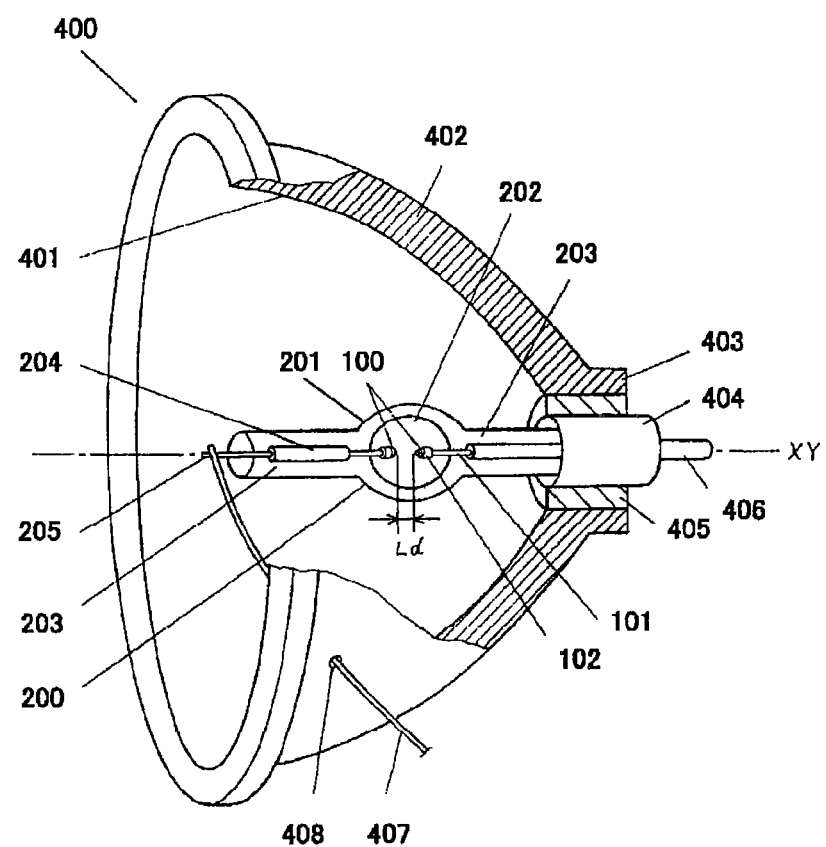
FIG. 14 is a partially cutaway perspective view of a lamp unit in Embodiment 4 of the present invention.

FIG. 14 is a partially cutaway perspective view of a lamp unit in Embodiment 4 of the present invention. As shown in FIG. 14, the lamp unit in Embodiment 4 of the present invention (hereinafter, referred to as a "lamp unit 400") includes the high pressure discharge lamp 200 and a reflection mirror 402 having a concave reflection surface 401. The high pressure discharge lamp 200 is built into the reflection mirror 402 such that light emitted from the high pressure discharge lamp 200 is reflected off the reflection surface 401.

The concave reflection surface 401 is formed on an inner surface of the reflection mirror 402, and light emitted from the high pressure discharge lamp 200 is reflected off the reflection surface 401. In order for the reflection mirror 402 to collect light emitted from the high pressure discharge lamp 200 efficiently, the high pressure discharge lamp 200 is built into the reflection mirror 402 such that a longitudinal central axis X of the high pressure discharge lamp 200 approximately corresponds to an optical axis Y of the reflection mirror 402. Note that the reflection surface 401 includes, for example, a spheroidal surface and a rotational parabolic surface. Although a surface produced by depositing a multilayer interference film or the like is commonly used as the reflection surface 401, the reflection surface 401 is not particularly limited in the present invention.

The sealing part 203 located on a side of a neck part 403 of the reflection mirror 402 is inserted into a base 404, and fixed to the reflection mirror 402. The base 404 has, for example, a cylindrical shape. The base 404 is fixed to the reflection mirror 402 by an adhesive agent 405 or the like. A terminal 406 for connecting to a power source is attached along the base 404.

The lead wire 205 of the high pressure discharge lamp 200 that is located on the opposite side of the base 404 is connected to a power supply line 407. The power supply line 407 is inserted into a through hole formed in the reflection mirror 402.

Note that, although the high pressure discharge lamp 200 is used in FIG. 14, the high pressure discharge lamp 300 may be used.

As set forth the above, with the structure of the lamp unit 400 in Embodiment 4 of the present invention, reliability is improved as the lamp unit 400 includes the high pressure discharge lamp 200 or 300 that prevents breakage of the sealing part 203 and the electrode 100.

Embodiment 5

Figure 15:
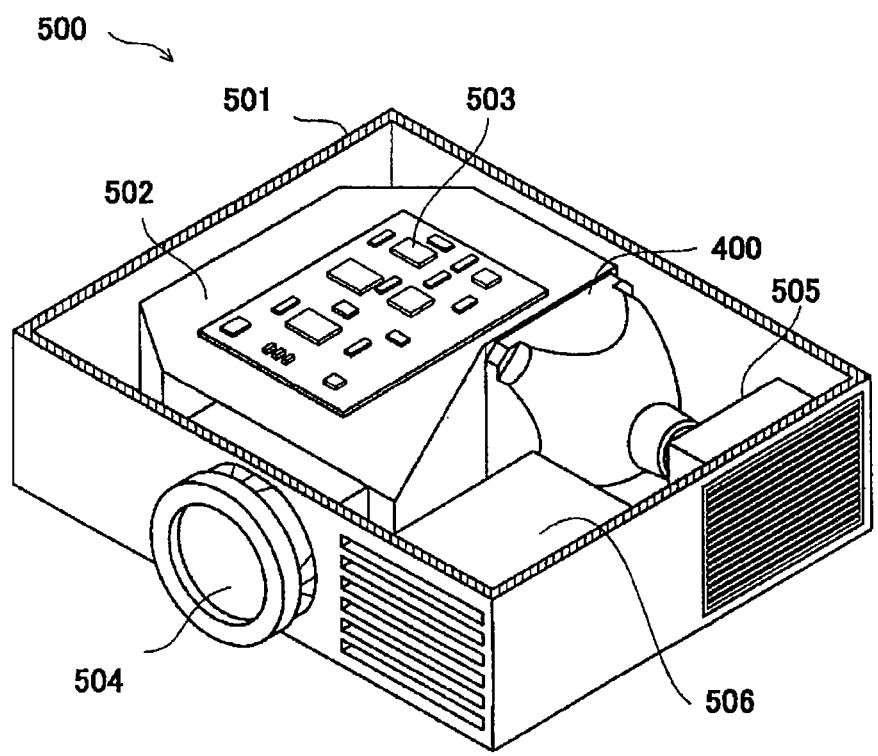
FIG. 15 is a perspective view of a projection image display apparatus in Embodiment 5 of the present invention.

FIG. 15 is a perspective view of a projection image display apparatus in Embodiment 5 of the present invention. The projection image display apparatus in Embodiment 5 of the present invention (hereinafter, referred to as an "image display apparatus 500") is a projector that projects an image onto a screen (not illustrated) that is placed in front of the image display apparatus 500.

The image display apparatus 500 includes the lamp unit 400, an optical unit 502, and a projection device 504. The optical unit 502 forms an optical image by modulating light emitted from the lamp unit 400. The projection device 504 enlarges and projects the optical image.

Specifically, the image display apparatus 500 includes a housing 501, the lamp unit 400, the optical unit 502, a control unit 503, the projection device 504, a cooling fan unit 505, and a power supply unit 506. The lamp unit 400, the optical unit 502, the control unit 503, the projection device 504, the cooling fan unit 505, and the power supply unit 506 are all housed in the housing 501.

The power supply unit 506 includes a DC power supply circuit (not illustrated) and a high pressure discharge lamp lighting device (not illustrated). The power supply unit 506 converts electric power supplied from a commercial power source into electric power suitable for the control unit 503, the lamp unit 400, and the cooling fan unit 505 to supply to the control unit 503, the lamp unit 400, and the cooling fan unit 505, respectively. Note that a top board of the housing 501 is omitted from FIG. 15 so that internal components of the image display apparatus 500 can be seen.

As set forth the above, with the structure of the image display apparatus 500 in Embodiment 5 of the present invention, reliability is improved as the image display apparatus 500 includes the high pressure discharge lamp 200 or 300 that prevents breakage of the sealing part 203 and the electrode 100.

Embodiment 6

Figure 16:
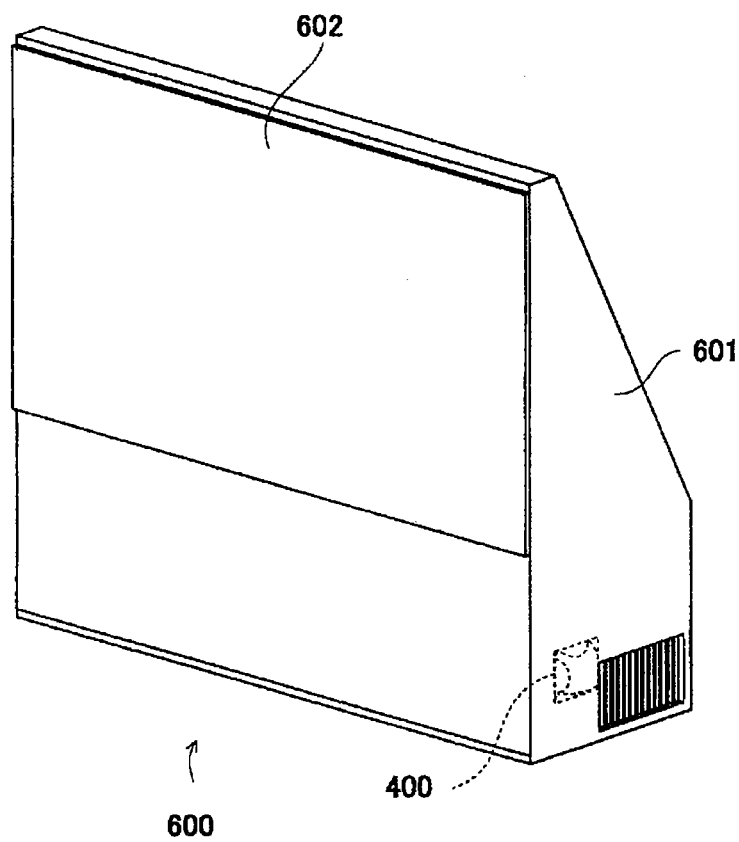
FIG. 16 is a perspective view of a projection image display apparatus in Embodiment 6 of the present invention.

FIG. 16 is a perspective view of a projection image display apparatus in Embodiment 6 of the present invention. The projection image display apparatus in Embodiment 6 of the present invention (hereinafter, referred to as an "image display apparatus 600") is a rear projector including a housing 601, the lamp unit 400, an optical unit (not illustrated), a projection device (not illustrated), a mirror (not illustrated), and the like. The lamp unit 400, the optical unit, the projection device, the mirror, and the like are all housed in the housing 601. The high pressure discharge lamp is built into the lamp unit 400.

The image display apparatus 600 displays an image by projecting, from behind a translucent screen 602 provided at an opening of the housing 601, an image projected from a projection lens (not illustrated) and then reflected off the mirror (not illustrated).

As set forth the above, with the structure of the image display apparatus 600 in Embodiment 6 of the present invention, reliability is improved as the image display apparatus 600 includes the high pressure discharge lamp 200 or 300 that prevents breakage of the sealing part 203 and the electrode 100.

<Modifications>

While having been particularly described with reference to the above-mentioned embodiments, the present invention is not limited to those described in the above-mentioned embodiments. The present invention may be applied to a variety of electrodes used for a discharge lamp, methods of manufacturing the electrode used for a discharge lamp, high pressure discharge lamps, lamp units, and projection image display apparatuses.

For example, structures described in the following Modifications may be applied to the electrode having at least one of the above-mentioned first and second features.

Figure 17A:
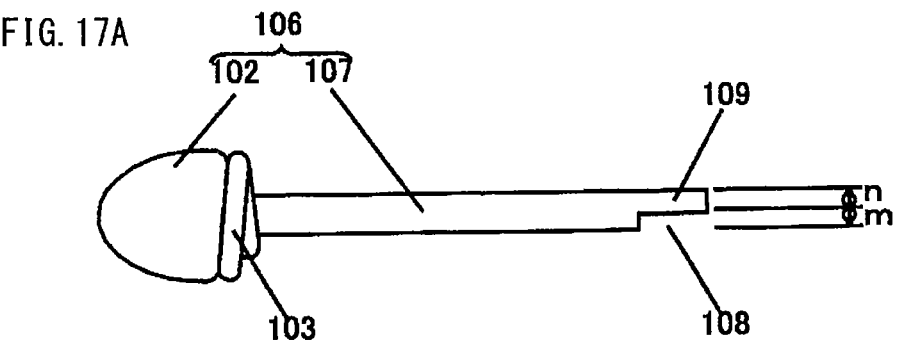
FIGS. 17A, 17B, 17C, and 17D are front views of Modifications 1, 1a, 1b, and 1c of the electrode used for a discharge lamp in Embodiment 1 of the present invention, respectively.

1. Modifications of Electrode 1-1. Modification 1 of Electrode Used for Discharge Lamp FIG. 17A is a front view of Modification 1 of the electrode used for a discharge lamp in Embodiment 1 of the present invention. The electrode used for a discharge lamp in Modification 1 of the present invention (hereinafter, referred to as an "electrode 106") is substantially the same as the electrode 100 except that the electrode 106 has a cut-out portion 108 at one end of a rod-shaped part 107. Therefore, the cut-out portion will be described in detail below, and the other elements are not described here.

The electrode 106 has the cut-out portion 108 at an end of the rod-shaped part 107 that is located on the opposite side of the electrode part 102. The cut-out portion 108 has been formed by splitting the end of the rod-shaped part 107 along an axis of the rod-shaped part 107.

In this case, the end of the rod-shaped part 107 located on the opposite side of the electrode part 102 is connected to a metal foil easily, because an area of the end of the rod-shaped part 107 connected to the metal foil is increased by the cut-out portion 108.

Figure 17B:
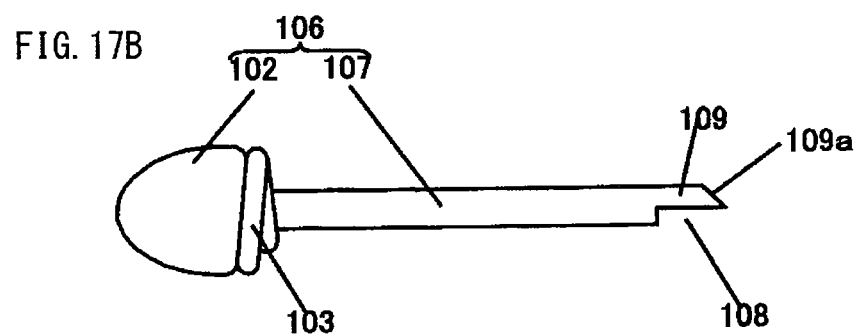

Note that a shape of the cut-out portion 108 is not limited to that shown in FIG. 17A. For example, as shown in Modification 1a of FIG. 17B, an end surface 109a of a remaining portion 109 of the rod-shaped part 107 may slope toward the electrode part 102 in a direction away from the cut-out portion 108. In this case, distortion of the sealing part can be reduced, because glass constituting the sealing part easily adheres to the end surface 109a of the remaining portion 109 when the cut-out portion 108 of the rod-shaped part 107 is connected to the metal foil and then sealed by the sealing part of the high pressure discharge lamp.

Figure 17C:
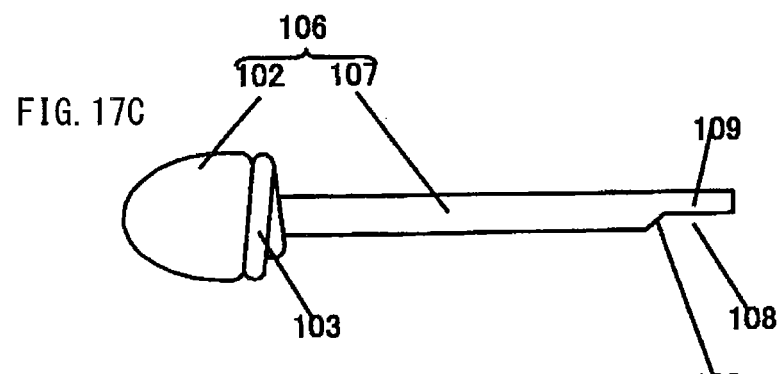

Also, as shown in Modification 1b of FIG. 17C, an end surface 108a of the cut-out portion 108 of the rod-shaped part 107 may slope toward the electrode part 102 in a direction away from the remaining portion 109. In this case, distortion of the sealing part can be reduced, because glass constituting the sealing part easily adheres to the end surface 108a of the cut-out portion 108 when the cut-out portion 108 of the rod-shaped part 107 is connected to the metal foil and then sealed by the sealing part of the high pressure discharge lamp.

Figure 17D:
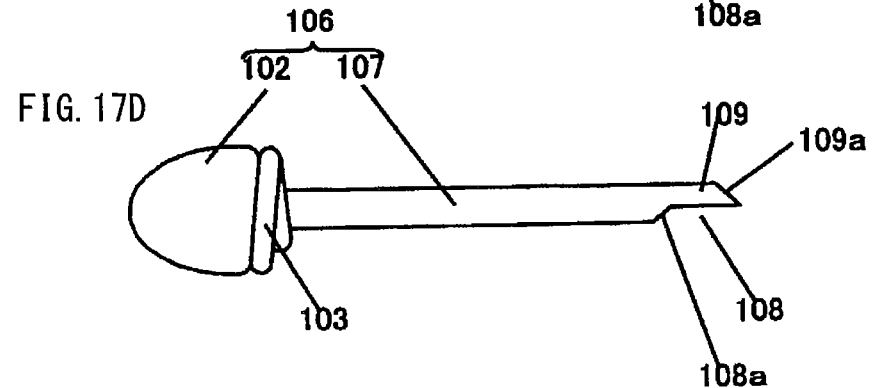

Also, as shown in Modification 1c of FIG. 17D, the end surface 109a of the remaining portion 109 may slope toward the electrode part 102 in a direction away from the cut-out portion 108, and the end surface 108a of the cut-out portion 108 may slope toward the electrode part 102 in a direction away from the remaining portion 109. In this case, distortion of the sealing part can further be reduced, because glass constituting the sealing part easily adheres to the end surface 109a of the remaining portion 109 and the end surface 108a of the cut-out portion 108 when the cut-out portion 108 of the rod-shaped part 107 is connected to the metal foil and then sealed by the sealing part of the high pressure discharge lamp.

A ratio between a diameter m of the cut-out portion 108 and a diameter n of the remaining portion in a radial direction of the rod-shaped part 107 is preferably in a range of 1:0.25 to 1:4 inclusive. In this case, while the breakage of the remaining portion 109 is prevented, sealing properties of the sealing part are improved when the electrode is used for a high pressure discharge lamp. The ratio between the diameters m and n is more preferably in a range of 1:0.3 to 1:3 inclusive.

The cut-out portion 108 may be formed in any step to manufacture the electrode 106. It is, however, preferable that the cut-out portion 108 be formed before the heat-treatment step and the etching step. In this case, a surface of the cut-out portion 108 is also roughened appropriately. When the cut-out portion 108 is connected to the metal foil by resistance welding, a resistance value increases appropriately, and thus the cut-out portion 108 and the metal foil are easily welded together.

Note that the "end surface" in each of FIGS. 17A, B, C, and D indicates a surface of the rod-shaped part that can be seen from an axial direction of the rod-shaped part. Therefore, Ry1 can also be measured on a line extending from a center to a periphery of the end surface, similarly to Embodiment 1 of the present invention.

1-2. Modification 2 of Electrode Used for Discharge Lamp

Figure 18A:
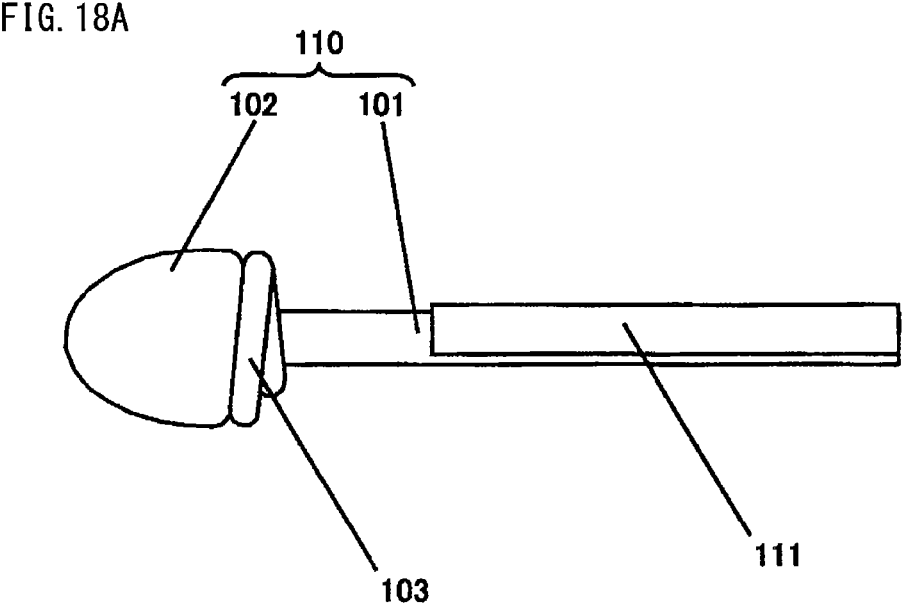
FIGS. 18A and 18B are front views of Modifications 2 and 3 of the electrode used for a discharge lamp in Embodiment 1 of the present invention, respectively.

FIG. 18A is a front view of Modification 2 of the electrode used for a discharge lamp in Embodiment 1 of the present invention. The electrode used for a discharge lamp in Modification 2 of the present invention (hereinafter, referred to as an "electrode 110") is substantially the same as the electrode 100 except that at least a part of the rod-shaped part 101 is covered with a metal member 111. Therefore, the metal member 111 will be described in detail below, and the other elements are not described here.

The metal member 111 is a sleeve made of molybdenum and has an approximately cylindrical shape, for example. The metal member 111 has a slit extending along a longitudinal direction thereof. The rod-shaped part 101 is covered with the metal member 111, but a surface of the rod-shaped part 101 is partially exposed from the slit of the metal member 111.

Since at least a part of the rod-shaped part 101 is covered with the metal member 111, stresses caused at the sealing part is relieved by the metal member 111 and the rough surface of the rod-shaped part 101 exposed from the slit of the metal member 111, when the electrode 110 is used for a high pressure discharge lamp.

Note that, although an end of the metal member 111 corresponds to the end of the rod-shaped part 101 located on an opposite side of the electrode part 102 in FIG. 18A, the end of the metal member 111 may be slightly away from the end of the rod-shaped part 101 located on an opposite side of the electrode part 102 toward the electrode part 102.

Figure 18B:
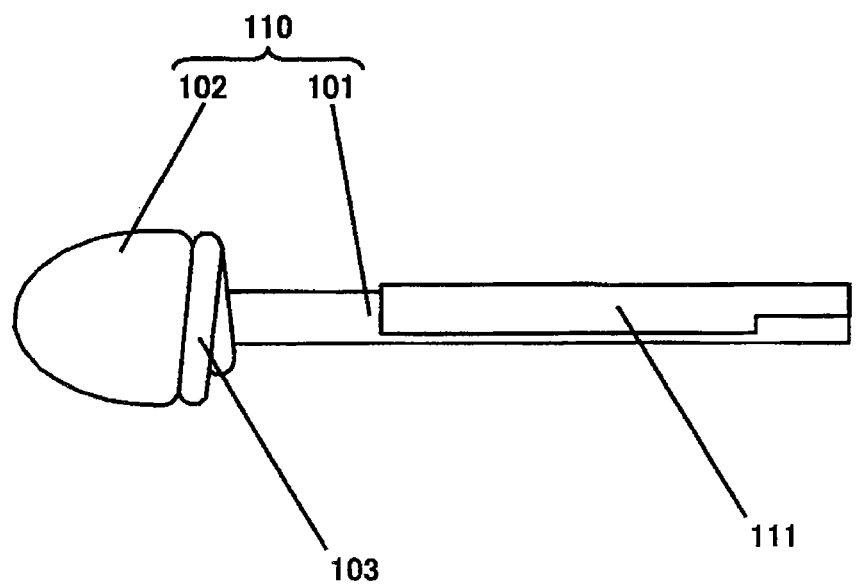

Also, as shown in Modification 3 of FIG. 18B, the end of the metal member 111 located on an opposite side of the electrode part 102 may be cut out. In this case, the rod-shaped part 101 is connected to the metal foil easily, because the metal member 111 is less likely to tough the end of the rod-shaped part 101 located on an opposite side of the electrode part 102 when the end is connected to the metal foil.

The metal member 111 does not need to be made of molybdenum. In terms of heat resistance, the metal member 111 may be made of molybdenum, niobium, tantalum, tungsten, or an alloy containing at least one of them as a main component.

Furthermore, a cut-out portion (not illustrated) may be formed at an end of the rod-shaped part 101, similarly to the electrode 106 shown in FIGS. 17A, B, C, and D.

2. Modification of High Pressure Discharge Lamp

Figure 19A:
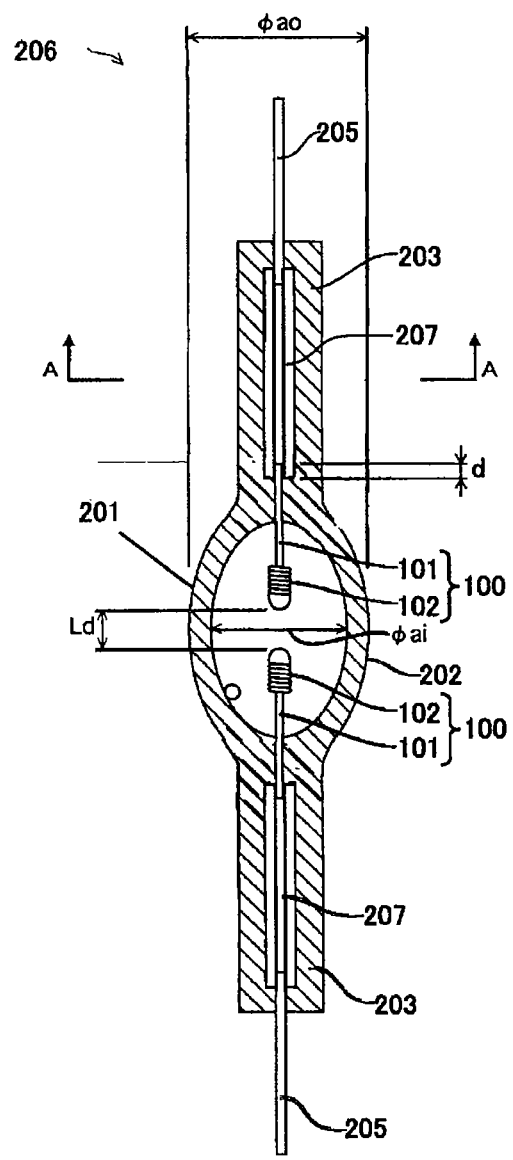
FIG. 19A is a sectional view of Modification 1 of the high pressure discharge lamp in Embodiment 2 of the present invention including a longitudinal central axis thereof.
Figure 19B:
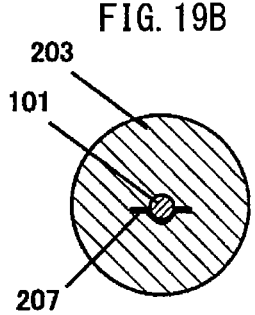
FIG. 19B is a sectional view of the same taken along the line A-A' of FIG. 19A.

FIG. 19A is a sectional view of the high pressure discharge lamp in Embodiment 2 of the present invention including a longitudinal central axis thereof. FIG. 19B is a sectional view of the high pressure discharge lamp in Embodiment 2 of the present invention taken along the line A-A' of FIG. 19A. A high pressure discharge lamp in Modification of the high pressure discharge lamp in Embodiment 2 of the present invention (hereinafter, referred to as a "lamp 206") is substantially the same as the lamp 200 except that a shape of the metal foil 207 is different. Therefore, the metal foil 207 will be described in detail below, and the other elements are not described here. Note that, in FIG. 19A, the electrode 100, the metal foil 207, and the lead wire 205 are not shown in cross section for the sake of convenience.

The metal foil 207 is bent so as to follow the shape of the rod-shaped part 101 along a longitudinal direction thereof. Specifically, as shown in FIG. 19B, the metal foil 207 is bent at an approximately central portion thereof in a radial direction of the rod-shaped part 101 so as to cover a half of a circumference of the rod-shaped part 101. In this case, it becomes possible to prevent the metal foil 207 from being curved inadvertently and from shifting from a position in which the electrode 100 is to be sealed when the metal foil 207 is sealed by the sealing part 203.

The shape of the metal foil 207 is not limited to that shown in FIGS. 19A and B. The metal foil 207 may have a saw tooth shape, a zigzag shape, a U shape, a shape like a U but with right angles, or the like in cross section as long as the metal foil 207 is bent so as to follow the shape of the rod-shaped part 101 along a longitudinal direction thereof, when the metal foil 207 is cut in a radial direction of the rod-shaped part 101.

INDUSTRIAL APPLICABILITY

The present invention may be broadly applicable to an electrode used for a discharge lamp, a method of manufacturing the electrode used for a discharge lamp, a high pressure discharge lamp, a lamp unit, and a projection image display apparatus.

REFERENCE SIGNS LIST 100, 106, 110 electrode used for discharge lamp
101, 107 rod-shaped part
102 electrode part
103 coil
104 rod-shaped member
105 coiled body
200, 206, 300 high pressure discharge lamp
201 arc tube
202 light-emitting part
203 sealing part
204, 207 metal foil
205 lead wire
400 lamp unit
401 reflection surface
402 reflection mirror
500, 600 projection image display apparatus
502 optical unit
504 projection device

The invention claimed is:

1. An electrode used for a discharge lamp and having a rod-shaped part, one end of the rod-shaped part to be sealed by a sealing part of an arc tube of the discharge lamp, the other end of the rod-shaped part to be in a discharge space in the arc tube, wherein
the rod-shaped part, sealed in the sealing part of the arc tube, has a rough surface that is composed of a plurality of types of crystal grains each having a different crystal orientation, that has been etched, and
the crystal orientation of each type of crystal grain differs depending on whether and to what degree the type of crystal grain has been etched, and
at least a crystal grain having a [001] crystal orientation included in the plurality of types of crystal grains has been etched.

2. The electrode of claim 1, wherein
a crystal grain having a [111] crystal orientation included in the plurality of types of crystal grains has been etched less than crystal grains having any other crystal orientations.

3. The electrode of claim 1, wherein
the rod-shaped part is made of high purity tungsten containing, as a subcomponent, at least one element selected from the group consisting of Al, Ca, Cr, Cu, Fe, Mg, Mn, Ni, Si, Sn, Na, K, Mo, U, and Th, with a total content of 10 ppm or less.

4. The electrode of claim 1, wherein
Ry1 is 40 μm or lower, where Ry1 denotes a maximum height with respect to line roughness of a surface of the one end of the rod-shaped part, and
Ry2 is in a range of 10 to 40 μm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

5. A high pressure discharge lamp comprising:
the electrode of claim 1; and
an arc tube made of glass, wherein
the arc tube includes:
    a light-emitting part having therein a discharge space in which a substance is enclosed; and
    a sealing part connected to the light-emitting part, and
the one end of the rod-shaped part is sealed by the sealing part.

6. A lamp unit comprising:
the high pressure discharge lamp of claim 5; and
a reflection mirror having a concave reflection surface, wherein
the high pressure discharge lamp is built into the reflection mirror such that light emitted from the high pressure discharge lamp is reflected off the reflection surface.

7. A projection image display apparatus comprising:
the lamp unit of claim 6;
an optical unit forming an optical image by modulating light emitted from the lamp unit; and
a projection device enlarging and projecting the optical image.

8. An electrode used for a discharge lamp and having a rod-shaped part, one end of the rod-shaped part to be sealed by a sealing part of an arc tube of the discharge lamp, the other end of the rod-shaped part to be in a discharge space in the arc tube, wherein
Ry1 is 40 μm or lower, where Ry1 denotes a maximum height with respect to line roughness of a surface of the one end of the rod-shaped part, and
Ry2 is in a range of 10 to 40 μm inclusive, where Ry2 denotes a maximum height with respect to line roughness in a circumferential direction of a surface of the rod-shaped part at a position one-third of the length of the rod-shaped part in a longitudinal direction from the one end of the rod-shaped part.

9. A high pressure discharge lamp comprising:
the electrode of claim 8; and
an arc tube made of glass, wherein the arc tube includes:
    a light-emitting part having therein a discharge space in which a substance is enclosed; and
    a sealing part connected to the light-emitting part, and
the one end of the rod-shaped part is sealed by the sealing part.

10. A lamp unit comprising:
the high pressure discharge lamp of claim 9; and
a reflection mirror having a concave reflection surface, wherein
the high pressure discharge lamp is built into the reflection mirror such that light emitted from the high pressure discharge lamp is reflected off the reflection surface.

11. A projection image display apparatus comprising:
the lamp unit of claim 10;
an optical unit forming an optical image by modulating light emitted from the lamp unit; and
a projection device enlarging and projecting the optical image.

* * * * *